(12) United States Patent
Fortini et al.

(10) Patent No.: US 8,918,729 B2
(45) Date of Patent: Dec. 23, 2014

(54) DESIGNING ELECTRONIC FORMS

(75) Inventors: Christian Fortini, Sammamish, WA (US); Jean D. Paoli, Kirkland, WA (US); Laurent Mollicone, Kirkland, WA (US); Bulusu Krishna Mohan, Redmond, WA (US); Alessandro Catorcini, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 12/061,613

(22) Filed: Apr. 2, 2008

(65) Prior Publication Data

US 2009/0177961 A1 Jul. 9, 2009

Related U.S. Application Data

(62) Division of application No. 10/395,506, filed on Mar. 24, 2003, now Pat. No. 7,415,672.

(51) Int. Cl.
*G06F 3/0484* (2013.01)
*G06F 17/24* (2006.01)
*G06F 17/22* (2006.01)

(52) U.S. Cl.
CPC .......... *G06F 17/2247* (2013.01); *G06F 3/0484* (2013.01); *G06F 17/243* (2013.01)
USPC .......................................... 715/760; 715/853

(58) Field of Classification Search
USPC ......... 715/760, 761–763, 853–855, 780, 506; 709/246, 223–224
See application file for complete search history.

(56) References Cited

U.S. PATENT DOCUMENTS

| | | | |
|---|---|---|---|
| 2,804,878 | A | 9/1957 | Fishwood et al. |
| 3,091,077 | A | 5/1963 | Erickson et al. |
| 3,104,520 | A | 9/1963 | Cazier et al. |
| 3,195,805 | A | 7/1965 | Cholvin et al. |
| 3,196,606 | A | 7/1965 | Cholvin et al. |
| 3,812,942 | A | 5/1974 | Espenschied et al. |
| 3,874,828 | A | 4/1975 | Herschler et al. |
| 3,961,748 | A | 6/1976 | McNabney |
| 4,005,578 | A | 2/1977 | McNabney |
| 4,005,579 | A | 2/1977 | Lloyd |

(Continued)

FOREIGN PATENT DOCUMENTS

| | | |
|---|---|---|
| AU | 2006200285 | 1/2011 |
| AU | 2006200483 | 5/2011 |

(Continued)

OTHER PUBLICATIONS

"Final Office Action", U.S. Appl. No. 11/036,910, (May 26, 2010), 9 pages.

(Continued)

*Primary Examiner* — Steven Sax
(74) *Attorney, Agent, or Firm* — Tom Wong; Jim Ross; Micky Minhas

(57) ABSTRACT

A system and method enabling a designer to build electronic forms from hierarchical data is described. Displays of hierarchical data, facilitation of selection of a portion of the hierarchical data, and displays of one or more transformation-language components associated with a selected portion of hierarchical data are described. From the transformation-language components selected by a designer, generation of an electronic form is also described.

15 Claims, 11 Drawing Sheets

(56) References Cited

U.S. PATENT DOCUMENTS

| | | |
|---|---|---|
| 4,060,340 A | 11/1977 | Yanik et al. |
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yumane et al. |
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,783,648 A | 11/1988 | Homma et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 4,975,690 A | 12/1990 | Torres |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,287,448 A | 2/1994 | Nicol et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,325,481 A | 6/1994 | Hunt |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,965 A | 7/1995 | Matheny et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,463,726 A | 10/1995 | Price |
| 5,481,722 A | 1/1996 | Skinner |
| 5,497,489 A | 3/1996 | Menne |
| 5,504,898 A | 4/1996 | Klein |
| 5,511,116 A | 4/1996 | Shastry et al. |
| 5,517,655 A | 5/1996 | Collins et al. |
| 5,523,775 A | 6/1996 | Capps |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,548,745 A | 8/1996 | Egan et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,612,719 A | 3/1997 | Beernink et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,644,739 A | 7/1997 | Moursund |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,720,016 A | 2/1998 | Egashira |
| 5,721,824 A | 2/1998 | Taylor |
| 5,734,380 A | 3/1998 | Adams et al. |
| 5,740,439 A | 4/1998 | Atkinson et al. |
| 5,740,455 A | 4/1998 | Pavley et al. |
| 5,742,504 A | 4/1998 | Meyer et al. |
| 5,742,795 A | 4/1998 | Kussel |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,785,081 A | 7/1998 | Krawczyk et al. |
| 5,787,274 A | 7/1998 | Agrawal et al. |
| 5,790,796 A | 8/1998 | Sadowsky |
| 5,796,403 A | 8/1998 | Adams et al. |
| 5,798,757 A | 8/1998 | Smith |

(56) References Cited

U.S. PATENT DOCUMENTS

| | | |
|---|---|---|
| 5,799,311 A | 8/1998 | Agrawal et al. |
| 5,801,701 A | 9/1998 | Koppolu et al. |
| 5,801,702 A | 9/1998 | Dolan et al. |
| 5,802,304 A | 9/1998 | Stone |
| 5,802,530 A | 9/1998 | Van Hoff |
| 5,803,715 A | 9/1998 | Kitchener |
| 5,805,165 A | 9/1998 | Thorne, III et al. |
| 5,805,824 A | 9/1998 | Kappe |
| 5,806,079 A | 9/1998 | Rivette et al. |
| 5,815,138 A | 9/1998 | Tsubaki et al. |
| 5,815,830 A | 9/1998 | Anthony |
| 5,819,034 A | 10/1998 | Joseph et al. |
| 5,825,359 A | 10/1998 | Derby et al. |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,845,299 A | 12/1998 | Arora et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,870,735 A | 2/1999 | Agrawal et al. |
| 5,873,088 A | 2/1999 | Hayashi et al. |
| 5,875,815 A | 3/1999 | Ungerecht et al. |
| 5,898,434 A | 4/1999 | Small et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,926,796 A | 7/1999 | Walker et al. |
| 5,928,363 A | 7/1999 | Ruvolo |
| 5,929,858 A | 7/1999 | Shibata et al. |
| RE36,281 E | 8/1999 | Zuercher et al. |
| 5,940,075 A | 8/1999 | Mutschler, III et al. |
| 5,947,711 A | 9/1999 | Myers et al. |
| 5,950,010 A | 9/1999 | Hesse et al. |
| 5,950,221 A | 9/1999 | Draves et al. |
| 5,953,731 A | 9/1999 | Glaser |
| 5,956,481 A | 9/1999 | Walsh et al. |
| 5,960,199 A | 9/1999 | Brodsky et al. |
| 5,960,411 A | 9/1999 | Hartman et al. |
| 5,963,208 A | 10/1999 | Dolan et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,986,657 A | 11/1999 | Berteig et al. |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,006,241 A | 12/1999 | Purnaveja et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,035,336 A | 3/2000 | Lu et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 2,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,101,512 A * | 8/2000 | DeRose et al. ............... 715/234 |
| 6,105,012 A | 8/2000 | Chang et al. |
| 6,106,570 A | 8/2000 | Mizuhara |
| 6,108,637 A | 8/2000 | Blumenau |
| 6,108,783 A | 8/2000 | Kraweyzk et al. |
| 6,115,044 A | 9/2000 | Alimpich et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,161,107 A * | 12/2000 | Stern ............................ 707/722 |
| 6,163,772 A | 12/2000 | Kramer et al. |
| 6,167,521 A | 12/2000 | Smith et al. |
| 6,167,523 A | 12/2000 | Strong |
| 6,178,551 B1 | 1/2001 | Sana et al. |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,247,016 B1 | 6/2001 | Rastogi et al. |
| 6,253,366 B1 | 6/2001 | Mutschier, III |
| 6,253,374 B1 | 6/2001 | Drsevie et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,271,862 B1 | 8/2001 | Yu |
| 6,272,506 B1 | 8/2001 | Bell |
| 6,275,227 B1 | 8/2001 | DeStefano |
| 6,275,575 B1 | 8/2001 | Wu et al. |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,286,130 B1 | 9/2001 | Poulsen et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |

(56) References Cited

U.S. PATENT DOCUMENTS

| | | |
|---|---|---|
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,336,797 B1 | 1/2002 | Kazakis et al. |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,385,767 B1 | 5/2002 | Ziebell |
| 6,389,434 B1 | 5/2002 | Rivette et al. |
| 6,393,442 B1 | 5/2002 | Cromarty et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,401,077 B1 | 6/2002 | Godden et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,427,142 B1 | 7/2002 | Zachary et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,434,743 B1 | 8/2002 | Click et al. |
| 6,442,563 B1 | 8/2002 | Bacon et al. |
| 6,442,583 B1 | 8/2002 | Eilert et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,476,834 B1 | 11/2002 | Doval et al. |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |
| 6,493,007 B1 | 12/2002 | Pang |
| 6,493,702 B1 | 12/2002 | Adar et al. |
| 6,496,203 B1 | 12/2002 | Beaumont et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan |
| 6,505,300 B2 | 1/2003 | Chan et al. |
| 6,505,344 B1 | 1/2003 | Blais et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,559,966 B1 | 5/2003 | Laverty et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,574,655 B1 | 6/2003 | Libert et al. |
| 6,578,144 B1 | 6/2003 | Gennaro et al. |
| 6,580,440 B1 | 6/2003 | Wagner et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,604,238 B1 | 8/2003 | Lim et al. |
| 6,606,606 B2 | 8/2003 | Star |
| 6,609,200 B2 | 8/2003 | Anderson et al. |
| 6,611,812 B2 | 8/2003 | Hurtado et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,242 B2 | 10/2003 | Bowman-Amuah |
| 6,636,845 B2 | 10/2003 | Chau et al. |
| 6,640,249 B1 * | 10/2003 | Bowman-Amuah ......... 709/228 |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,625 B1 | 1/2004 | Reise et al. |
| 6,678,717 B1 | 1/2004 | Schneider |
| 6,681,370 B2 | 1/2004 | Gounares et al. |
| 6,691,230 B1 | 2/2004 | Bardon |

(56) References Cited

U.S. PATENT DOCUMENTS

| | | |
|---|---|---|
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,708,172 B1 | 3/2004 | Wong et al. |
| 6,710,789 B1 | 3/2004 | Sekiguchi et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,732,102 B1 | 5/2004 | Khandekar et al. |
| 6,735,721 B1 | 5/2004 | Morrow et al. |
| 6,738,783 B2 | 5/2004 | Melli et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,757,890 B1 | 6/2004 | Wallman |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,774,928 B2 | 8/2004 | Bruzzone |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,806,892 B1 | 10/2004 | Plow et al. |
| 6,816,849 B1 | 11/2004 | Halt, Jr. |
| 6,823,478 B1 * | 11/2004 | Prologo et al. .................. 714/38 |
| 6,828,992 B1 | 12/2004 | Freeman et al. |
| 6,829,745 B2 | 12/2004 | Yassin et al. |
| 6,833,925 B1 | 12/2004 | Igoe et al. |
| 6,842,175 B1 | 1/2005 | Schmalstieg et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,084 B1 | 3/2005 | Dobner et al. |
| 6,874,130 B1 | 3/2005 | Baweja et al. |
| 6,874,143 B1 | 3/2005 | Murray |
| 6,876,996 B2 | 4/2005 | Czajkowski et al. |
| 6,883,168 B1 | 4/2005 | James et al. |
| 6,885,748 B1 | 4/2005 | Wang |
| 6,889,359 B1 | 5/2005 | Conner et al. |
| 6,901,403 B1 | 5/2005 | Bata et al. |
| 6,915,294 B1 * | 7/2005 | Singh et al. ........................... 1/1 |
| 6,915,454 B1 | 7/2005 | Moore et al. |
| 6,925,609 B1 | 8/2005 | Lucke |
| 6,931,532 B1 | 8/2005 | Davis |
| 6,941,129 B2 | 9/2005 | Marce et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,000,230 B1 | 2/2006 | Murray et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,013,340 B1 | 3/2006 | Burd et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,043,688 B1 | 5/2006 | Tsutsumi et al. |
| 7,051,273 B1 | 5/2006 | Holt et al. |
| 7,058,645 B2 | 6/2006 | Seto et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,092,992 B1 | 8/2006 | Yu |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalmanchi |
| 7,107,521 B2 | 9/2006 | Santos |
| 7,107,522 B1 * | 9/2006 | Morgan et al. ................. 715/201 |
| 7,107,539 B2 | 9/2006 | Abbott et al. |
| 7,120,863 B1 | 10/2006 | Wang |
| 7,124,167 B1 | 10/2006 | Bellotti et al. |
| 7,124,251 B2 | 10/2006 | Clark et al. |
| 7,130,885 B2 | 10/2006 | Chandra et al. |
| 7,134,083 B1 * | 11/2006 | Guerrero ....................... 715/760 |
| 7,143,103 B1 | 11/2006 | Zisman et al. |
| 7,143,341 B1 | 11/2006 | Kohli |
| 7,146,564 B2 | 12/2006 | Kim et al. |
| 7,152,027 B2 | 12/2006 | Andrade et al. |
| 7,152,205 B2 | 12/2006 | Day et al. |
| 7,159,011 B1 | 1/2007 | Knight et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,197,515 B2 | 3/2007 | Rivers-Moore et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,228,541 B2 | 6/2007 | Gupton et al. |
| 7,234,105 B2 * | 6/2007 | Bezrukov et al. ............. 715/202 |
| 7,236,982 B2 | 6/2007 | Zlatanov et al. |
| 7,237,114 B1 | 6/2007 | Rosenberg |
| 7,249,328 B1 | 7/2007 | Davis |
| 7,251,777 B1 | 7/2007 | Valtchev et al. |
| 7,269,664 B2 | 9/2007 | Hutsch et al. |
| 7,269,788 B2 | 9/2007 | Gharavy |
| 7,272,789 B2 | 9/2007 | O'Brien |
| 7,272,815 B1 | 9/2007 | Eldridge |
| 7,275,216 B2 | 9/2007 | Paoli et al. |
| 7,281,018 B1 | 10/2007 | Begun et al. |
| 7,281,206 B2 | 10/2007 | Schnelle et al. |
| 7,281,245 B2 | 10/2007 | Reynar et al. |
| 7,284,208 B2 | 10/2007 | Matthews |
| 7,284,239 B1 | 10/2007 | Young et al. |
| 7,287,218 B1 | 10/2007 | Knotz et al. |
| 7,293,268 B2 | 11/2007 | Masuda et al. |
| 7,295,336 B2 | 11/2007 | Yoshida et al. |
| 7,296,017 B2 | 11/2007 | Larcheveque et al. |
| 7,305,613 B2 | 12/2007 | Oezgen |
| 7,308,646 B1 | 12/2007 | Cohen et al. |

(56) References Cited

U.S. PATENT DOCUMENTS

| | | |
|---|---|---|
| 7,313,757 B2 | 12/2007 | Bradley et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,187 B1 | 2/2008 | Stanciu et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,360,171 B2 | 4/2008 | Ruthfield et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,392,522 B2 | 6/2008 | Murray |
| 7,406,660 B1 | 7/2008 | Sikchi et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,430,711 B2 | 9/2008 | Rivers-Moore et al. |
| 7,441,200 B2 | 10/2008 | Savage |
| 7,451,392 B1 | 11/2008 | Chalecki et al. |
| 7,490,109 B1 | 2/2009 | Sikchi et al. |
| 7,490,167 B2 * | 2/2009 | Pena et al. .................... 709/246 |
| 7,496,632 B2 | 2/2009 | Chapman et al. |
| 7,496,837 B1 | 2/2009 | Larcheveque et al. |
| 7,512,896 B2 | 3/2009 | Rockey et al. |
| 7,516,145 B2 | 4/2009 | Sikchi et al. |
| 7,516,399 B2 | 4/2009 | Hsu et al. |
| 7,533,268 B1 | 5/2009 | Catorcini |
| 7,543,228 B2 | 6/2009 | Kelkar |
| 7,549,115 B2 | 6/2009 | Kotler |
| 7,562,215 B2 | 7/2009 | Cummins |
| 7,568,101 B1 | 7/2009 | Catorcini |
| 7,581,177 B1 | 8/2009 | Mollicone et al. |
| 7,584,417 B2 | 9/2009 | Friend |
| 7,610,562 B2 | 10/2009 | Rockey et al. |
| 7,613,996 B2 | 11/2009 | Dallett et al. |
| 7,624,356 B1 | 11/2009 | Rockey et al. |
| 7,653,687 B2 | 1/2010 | Resiman |
| 7,669,116 B2 * | 2/2010 | Lopata et al. ................. 715/224 |
| 7,673,227 B2 | 3/2010 | Kotler |
| 7,673,228 B2 | 3/2010 | Kelkar |
| 7,676,843 B1 | 3/2010 | Stott |
| 7,689,929 B2 | 3/2010 | Ruthfield |
| 7,692,636 B2 | 4/2010 | Kim |
| 7,707,487 B2 | 4/2010 | Easter et al. |
| 7,712,022 B2 | 5/2010 | Smuga |
| 7,712,048 B2 | 5/2010 | Rockey et al. |
| 7,721,190 B2 | 5/2010 | Sikchi |
| 7,725,834 B2 | 5/2010 | Bell |
| 7,739,602 B2 | 6/2010 | Feng et al. |
| 7,743,063 B2 | 6/2010 | James et al. |
| 7,755,786 B2 | 7/2010 | Foehr et al. |
| 7,774,620 B1 | 8/2010 | Stott |
| 7,779,027 B2 | 8/2010 | James |
| 7,809,698 B1 | 10/2010 | Salz et al. |
| 7,818,677 B2 | 10/2010 | Ruthfield |
| 7,865,477 B2 | 1/2011 | Larcheveque |
| 7,900,134 B2 | 3/2011 | Ardeleanu |
| 7,904,801 B2 | 3/2011 | Catorcini et al. |
| 7,913,159 B2 | 3/2011 | Larcheveque |
| 7,925,621 B2 | 4/2011 | Sikchi |
| 7,934,098 B1 | 4/2011 | Hahn et al. |
| 7,937,651 B2 | 5/2011 | Kelkar |
| 7,971,139 B2 | 6/2011 | Stanciu |
| 7,979,856 B2 | 7/2011 | Murray |
| 8,001,459 B2 | 8/2011 | Rivers-Moore |
| 8,010,515 B2 | 8/2011 | Mirzad |
| 8,074,217 B2 | 12/2011 | James |
| 8,117,552 B2 | 2/2012 | Paoli |
| 8,200,975 B2 | 6/2012 | O'Connor |
| 8,429,522 B2 | 4/2013 | Stanciu et al. |
| 8,487,879 B2 | 7/2013 | Kim et al. |
| 8,819,072 B1 | 8/2014 | Cupala et al. |
| 2001/0003828 A1 | 6/2001 | Peterson et al. |
| 2001/0007109 A1 | 7/2001 | Lange |
| 2001/0013947 A1 | 8/2001 | Van Der Linden et al. |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0027472 A1 | 10/2001 | Guan |
| 2001/0037345 A1 | 11/2001 | Kieman et al. |
| 2001/0044850 A1 | 11/2001 | Raz et al. |
| 2001/0047372 A1 | 11/2001 | Gorelik et al. |
| 2001/0051907 A1 | 12/2001 | Kumar et al. |
| 2001/0051928 A1 | 12/2001 | Brody |
| 2001/0052121 A1 | 12/2001 | Masuda et al. |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019812 A1 | 2/2002 | Board et al. |
| 2002/0019941 A1 | 2/2002 | Chan et al. |
| 2002/0023111 A1 | 2/2002 | Arora et al. |
| 2002/0023113 A1 | 2/2002 | Hsing et al. |
| 2002/0026356 A1 | 2/2002 | Bergh et al. |
| 2002/0026441 A1 | 2/2002 | Kutay et al. |
| 2002/0026461 A1 | 2/2002 | Kutay et al. |
| 2002/0026462 A1 | 2/2002 | Shotton et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0035617 A1 | 3/2002 | Lynch et al. |
| 2002/0040469 A1 | 4/2002 | Pramberger |
| 2002/0049790 A1 | 4/2002 | Ricker et al. |
| 2002/0052769 A1 | 5/2002 | Navani et al. |
| 2002/0053021 A1 | 5/2002 | Rice et al. |
| 2002/0054115 A1 * | 5/2002 | Mack et al. ................... 345/765 |
| 2002/0054126 A1 | 5/2002 | Gamon |
| 2002/0054128 A1 | 5/2002 | Lau et al. |
| 2002/0057297 A1 | 5/2002 | Grimes et al. |
| 2002/0059566 A1 | 5/2002 | Delcambre et al. |
| 2002/0065798 A1 | 5/2002 | Bostleman et al. |
| 2002/0065847 A1 | 5/2002 | Furukawa et al. |
| 2002/0065950 A1 | 5/2002 | Katz et al. |
| 2002/0070973 A1 | 6/2002 | Croley |
| 2002/0072951 A1 | 6/2002 | Lee et al. |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0103711 A1 | 8/2002 | Karas et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0124172 A1 | 9/2002 | Manahan |
| 2002/0129056 A1 | 9/2002 | Conant |
| 2002/0133484 A1 | 9/2002 | Chau et al. |
| 2002/0143815 A1 | 10/2002 | Sather |
| 2002/0147726 A1 | 10/2002 | Yehia et al. |
| 2002/0147748 A1 | 10/2002 | Huang |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156905 A1 | 10/2002 | Weissman |
| 2002/0156929 A1 | 10/2002 | Hekmatpour |
| 2002/0169752 A1 | 11/2002 | Kusama et al. |
| 2002/0169789 A1 | 11/2002 | Kutay et al. |

(56) References Cited

U.S. PATENT DOCUMENTS

| | | |
|---|---|---|
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184213 A1 | 12/2002 | Lau et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0184491 A1 | 12/2002 | Morgan et al. |
| 2002/0188597 A1 | 12/2002 | Kern et al. |
| 2002/0188613 A1 | 12/2002 | Chakraborty et al. |
| 2002/0194219 A1* | 12/2002 | Bradley et al. .............. 707/506 |
| 2002/0194388 A1 | 12/2002 | Boloker et al. |
| 2002/0196281 A1 | 12/2002 | Audleman et al. |
| 2002/0196288 A1 | 12/2002 | Emrani |
| 2002/0197593 A1* | 12/2002 | Sutton ........................ 434/276 |
| 2002/0198891 A1 | 12/2002 | Li et al. |
| 2002/0198935 A1 | 12/2002 | Crandall et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0014406 A1 | 1/2003 | Faieta et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0023674 A1* | 1/2003 | Hildebrand .................. 709/203 |
| 2003/0023953 A1 | 1/2003 | Lucassen et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0028762 A1 | 2/2003 | Trilli et al. |
| 2003/0029911 A1 | 2/2003 | Kitayama |
| 2003/0033037 A1 | 2/2003 | Yuen et al. |
| 2003/0033179 A1 | 2/2003 | Katz et al. |
| 2003/0033606 A1 | 2/2003 | Puente et al. |
| 2003/0037021 A1 | 2/2003 | Krothappalli et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Llin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0058286 A1 | 3/2003 | Dano |
| 2003/0061386 A1 | 3/2003 | Brown et al. |
| 2003/0061567 A1 | 3/2003 | Brown et al. |
| 2003/0067497 A1* | 4/2003 | Pichon ........................ 345/853 |
| 2003/0069881 A1 | 4/2003 | Huttunen |
| 2003/0074279 A1 | 4/2003 | Viswanath |
| 2003/0084424 A1 | 5/2003 | Reddy et al. |
| 2003/0085918 A1 | 5/2003 | Beaumont et al. |
| 2003/0093755 A1 | 5/2003 | O'Carroll |
| 2003/0101414 A1 | 5/2003 | Liu et al. |
| 2003/0103071 A1* | 6/2003 | Lusen et al. ................. 345/705 |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135553 A1 | 7/2003 | Pendakur |
| 2003/0135825 A1 | 7/2003 | Gertner et al. |
| 2003/0140132 A1 | 7/2003 | Champagne |
| 2003/0140160 A1 | 7/2003 | Raz et al. |
| 2003/0142072 A1 | 7/2003 | Lapstun et al. |
| 2003/0145018 A1 | 7/2003 | Hitchcock et al. |
| 2003/0149737 A1 | 8/2003 | Lambert et al. |
| 2003/0149934 A1 | 8/2003 | Worden |
| 2003/0154464 A1 | 8/2003 | Ullmann et al. |
| 2003/0158897 A1 | 8/2003 | Ben-Nathan et al. |
| 2003/0163285 A1 | 8/2003 | Nakamura et al. |
| 2003/0167277 A1 | 9/2003 | Hejisberg et al. |
| 2003/0172113 A1 | 9/2003 | Cameron et al. |
| 2003/0182268 A1 | 9/2003 | Lai |
| 2003/0182327 A1 | 9/2003 | Ramanujam et al. |
| 2003/0182463 A1 | 9/2003 | Valk |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0197733 A1 | 10/2003 | Beauchamp et al. |
| 2003/0200254 A1* | 10/2003 | Wei ............................. 709/203 |
| 2003/0200506 A1 | 10/2003 | Abe et al. |
| 2003/0204481 A1* | 10/2003 | Lau ................................. 707/1 |
| 2003/0204511 A1 | 10/2003 | Brundage |
| 2003/0204814 A1 | 10/2003 | Elo et al. |
| 2003/0205615 A1 | 11/2003 | Marappan |
| 2003/0206170 A1* | 11/2003 | Bickmore et al. ........... 345/473 |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0212988 A1 | 11/2003 | Tsai et al. |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0229716 A1 | 12/2003 | Holland |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003341 A1* | 1/2004 | alSafadi et al. .............. 715/500 |
| 2004/0003353 A1 | 1/2004 | Rivera et al. |
| 2004/0003389 A1 | 1/2004 | Reynar et al. |
| 2004/0006744 A1 | 1/2004 | Jones et al. |
| 2004/0010752 A1 | 1/2004 | Chan et al. |
| 2004/0010753 A1 | 1/2004 | Salter |
| 2004/0015778 A1 | 1/2004 | Britton et al. |
| 2004/0015783 A1* | 1/2004 | Lennon et al. ............... 715/523 |
| 2004/0024720 A1 | 2/2004 | Fairweather |
| 2004/0024842 A1 | 2/2004 | Witt |
| 2004/0030991 A1 | 2/2004 | Hepworth et al. |
| 2004/0031052 A1 | 2/2004 | Wannamaker et al. |
| 2004/0032611 A1 | 2/2004 | Daly et al. |
| 2004/0039881 A1 | 2/2004 | Shoebridge et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0046787 A1* | 3/2004 | Henry et al. ................. 345/744 |
| 2004/0046789 A1 | 3/2004 | Inanoria |
| 2004/0047643 A1 | 3/2004 | Jackelen et al. |
| 2004/0054966 A1 | 3/2004 | Busch et al. |
| 2004/0059754 A1 | 3/2004 | Barghout et al. |
| 2004/0060006 A1 | 3/2004 | Lindblad et al. |
| 2004/0073565 A1 | 4/2004 | Kaufman et al. |
| 2004/0073868 A1 | 4/2004 | Easter et al. |
| 2004/0073924 A1 | 4/2004 | Pendakur |
| 2004/0078756 A1 | 4/2004 | Napper et al. |
| 2004/0083426 A1 | 4/2004 | Sahu |
| 2004/0083431 A1* | 4/2004 | Graham et al. .............. 715/526 |
| 2004/0088320 A1 | 5/2004 | Perry |
| 2004/0088647 A1 | 5/2004 | Miller et al. |
| 2004/0088652 A1 | 5/2004 | Abe et al. |
| 2004/0093296 A1 | 5/2004 | Phelan et al. |
| 2004/0093596 A1 | 5/2004 | Koyano |
| 2004/0107367 A1 | 6/2004 | Kisters |

(56) References Cited

U.S. PATENT DOCUMENTS

| | | |
|---|---|---|
| 2004/0111418 A1 | 6/2004 | Nguyen et al. |
| 2004/0117439 A1 | 6/2004 | Levett et al. |
| 2004/0117769 A1 | 6/2004 | Lauzon |
| 2004/0123277 A1 | 6/2004 | Schrader et al. |
| 2004/0128296 A1 | 7/2004 | Krishnamurthy et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0168119 A1* | 8/2004 | Liu et al. .................. 715/501.1 |
| 2004/0172442 A1 | 9/2004 | Ripley |
| 2004/0181543 A1* | 9/2004 | Wu et al. ..................... 707/102 |
| 2004/0181711 A1 | 9/2004 | Johnson et al. |
| 2004/0186762 A1 | 9/2004 | Beaven et al. |
| 2004/0189716 A1 | 9/2004 | Paoli et al. |
| 2004/0193465 A1 | 9/2004 | Sangroniz et al. |
| 2004/0194035 A1 | 9/2004 | Chakraborty |
| 2004/0196266 A1 | 10/2004 | Matsuura et al. |
| 2004/0199572 A1 | 10/2004 | Hunt et al. |
| 2004/0199577 A1 | 10/2004 | Burd et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0212586 A1 | 10/2004 | Denny |
| 2004/0215665 A1* | 10/2004 | Edgar et al. .................. 707/200 |
| 2004/0216084 A1 | 10/2004 | Brown et al. |
| 2004/0220912 A1 | 11/2004 | Manikutty et al. |
| 2004/0221238 A1 | 11/2004 | Cifra et al. |
| 2004/0221245 A1 | 11/2004 | Chickles et al. |
| 2004/0225749 A1 | 11/2004 | Pavlik et al. |
| 2004/0230676 A1 | 11/2004 | Spivack et al. |
| 2004/0237030 A1 | 11/2004 | Malkin |
| 2004/0237120 A1 | 11/2004 | Lewin et al. |
| 2004/0260593 A1 | 12/2004 | Abraham-Fuchs et al. |
| 2004/0261019 A1 | 12/2004 | Imamura et al. |
| 2004/0261032 A1 | 12/2004 | Olander et al. |
| 2004/0268229 A1 | 12/2004 | Paoli et al. |
| 2004/0268259 A1 | 12/2004 | Rockey et al. |
| 2004/0268260 A1 | 12/2004 | Rockey et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027676 A1 | 2/2005 | Eichstaedt |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033657 A1 | 2/2005 | Herrington et al. |
| 2005/0033728 A1 | 2/2005 | James et al. |
| 2005/0038711 A1 | 2/2005 | Marlelo |
| 2005/0044524 A1 | 2/2005 | Murray |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076022 A1 | 4/2005 | Wu et al. |
| 2005/0076049 A1 | 4/2005 | Qubti et al. |
| 2005/0080756 A1 | 4/2005 | Hitchcock et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108262 A1 | 5/2005 | Fawcett, Jr. et al. |
| 2005/0108624 A1 | 5/2005 | Carrier |
| 2005/0108633 A1 | 5/2005 | Sahota et al. |
| 2005/0108634 A1 | 5/2005 | Sahota et al. |
| 2005/0114757 A1 | 5/2005 | Sahota et al. |
| 2005/0114764 A1 | 5/2005 | Gudenkauf et al. |
| 2005/0119910 A1 | 6/2005 | Schneider |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149511 A1 | 7/2005 | Ruthfield |
| 2005/0149512 A1 | 7/2005 | Ruthfield |
| 2005/0149726 A1 | 7/2005 | Joshi et al. |
| 2005/0159136 A1 | 7/2005 | Rouse et al. |
| 2005/0160398 A1 | 7/2005 | Bjornson et al. |
| 2005/0165615 A1 | 7/2005 | Minar |
| 2005/0171746 A1 | 8/2005 | Thalhammer-Reyero |
| 2005/0177803 A1 | 8/2005 | Ruthfield et al. |
| 2005/0182645 A1 | 8/2005 | Ehlis et al. |
| 2005/0183006 A1* | 8/2005 | Rivers-Moore et al. ...... 715/513 |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0200907 A1 | 9/2005 | Kitayama et al. |
| 2005/0210263 A1 | 9/2005 | Levas et al. |
| 2005/0216439 A1 | 9/2005 | Kawakita |
| 2005/0216452 A1 | 9/2005 | Teague |
| 2005/0216837 A1 | 9/2005 | Washburn |
| 2005/0219226 A1 | 10/2005 | Liu et al. |
| 2005/0223063 A1 | 10/2005 | Chang et al. |
| 2005/0223320 A1 | 10/2005 | Brintzenhofe et al. |
| 2005/0228887 A1 | 10/2005 | Wang |
| 2005/0234890 A1 | 10/2005 | Enzler et al. |
| 2005/0240620 A1 | 10/2005 | Danner et al. |
| 2005/0240876 A1 | 10/2005 | Myers et al. |
| 2005/0246304 A1 | 11/2005 | Knight et al. |
| 2005/0256933 A1 | 11/2005 | Millington et al. |
| 2005/0257148 A1 | 11/2005 | Goodman et al. |
| 2005/0262112 A1 | 11/2005 | Moore |
| 2005/0268100 A1 | 12/2005 | Gasparini et al. |
| 2005/0268217 A1 | 12/2005 | Garrison |
| 2005/0268222 A1 | 12/2005 | Cheng |
| 2005/0289147 A1 | 12/2005 | Khan et al. |
| 2005/0289468 A1 | 12/2005 | Kahn et al. |
| 2006/0004703 A1 | 1/2006 | Spivack et al. |
| 2006/0004815 A1 | 1/2006 | Murata et al. |
| 2006/0004910 A1 | 1/2006 | Burd et al. |
| 2006/0010386 A1 | 1/2006 | Khan |
| 2006/0020586 A1 | 1/2006 | Prompt et al. |
| 2006/0020883 A1 | 1/2006 | Kothari et al. |
| 2006/0026500 A1 | 2/2006 | Qa 'Im-maqami' |
| 2006/0026534 A1 | 2/2006 | Ruthfield et al. |
| 2006/0031757 A9 | 2/2006 | Vincent |
| 2006/0036995 A1 | 2/2006 | Chickles et al. |
| 2006/0041593 A1 | 2/2006 | Borthakur et al. |
| 2006/0041838 A1 | 2/2006 | Khan |
| 2006/0053293 A1 | 3/2006 | Zager et al. |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0074933 A1 | 4/2006 | Barac et al. |
| 2006/0074969 A1 | 4/2006 | Barac et al. |
| 2006/0074981 A1 | 4/2006 | Mauceri |
| 2006/0075245 A1 | 4/2006 | Meier |
| 2006/0080657 A1 | 4/2006 | Goodman |
| 2006/0085409 A1 | 4/2006 | Rys et al. |
| 2006/0092138 A1 | 5/2006 | Kim et al. |

(56) References Cited

U.S. PATENT DOCUMENTS

| | | |
|---|---|---|
| 2006/0095507 A1 | 5/2006 | Watson |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0107224 A1 | 5/2006 | Friend et al. |
| 2006/0129917 A1 | 6/2006 | Volk et al. |
| 2006/0129978 A1 | 6/2006 | Abriani et al. |
| 2006/0136422 A1 | 6/2006 | Matveief et al. |
| 2006/0143220 A1 | 6/2006 | Spencer, Jr. |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0161845 A1 | 7/2006 | Kahn et al. |
| 2006/0173865 A1 | 8/2006 | Fong |
| 2006/0173985 A1 | 8/2006 | Moore |
| 2006/0184393 A1 | 8/2006 | Ewin et al. |
| 2006/0191662 A1 | 8/2006 | Deibl et al. |
| 2006/0195413 A1 | 8/2006 | Davis et al. |
| 2006/0200443 A1 | 9/2006 | Kahn et al. |
| 2006/0200740 A1 | 9/2006 | Kahn et al. |
| 2006/0200754 A1 | 9/2006 | Kablesh et al. |
| 2006/0203081 A1 | 9/2006 | Pulitzer |
| 2006/0206589 A1 | 9/2006 | Lentini et al. |
| 2006/0206803 A1 | 9/2006 | Smith |
| 2006/0218403 A1 | 9/2006 | Sauve et al. |
| 2006/0230363 A1 | 10/2006 | Rapp |
| 2006/0242663 A1 | 10/2006 | Gogerty |
| 2006/0248468 A1 | 11/2006 | Constantine et al. |
| 2006/0253459 A1 | 11/2006 | Kahn et al. |
| 2006/0253489 A1 | 11/2006 | Kahn et al. |
| 2006/0265518 A1 | 11/2006 | Owens et al. |
| 2006/0271839 A1 | 11/2006 | Gottlieb et al. |
| 2006/0282552 A1 | 12/2006 | Bhesiania et al. |
| 2006/0288011 A1 | 12/2006 | Gandhi et al. |
| 2006/0288329 A1 | 12/2006 | Gandhi |
| 2007/0005611 A1 | 1/2007 | Takasugi et al. |
| 2007/0005978 A1 | 1/2007 | O'Connor |
| 2007/0011156 A1 | 1/2007 | Maron |
| 2007/0011665 A1 | 1/2007 | Gandhi et al. |
| 2007/0036433 A1 | 2/2007 | Teutsch |
| 2007/0050446 A1 | 3/2007 | Moore |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100836 A1 | 5/2007 | Eichstaedt et al. |
| 2007/0100877 A1 | 5/2007 | Paoli |
| 2007/0100967 A1 | 5/2007 | Smith et al. |
| 2007/0101280 A1 | 5/2007 | Paoli |
| 2007/0101313 A1 | 5/2007 | Bodin et al. |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208759 A1 | 9/2007 | von Koch |
| 2007/0208769 A1 | 9/2007 | Boehm et al. |
| 2007/0245251 A1 | 10/2007 | Kim |
| 2007/0276768 A1 | 11/2007 | Pallante |
| 2008/0021916 A1 | 1/2008 | Schnelle et al. |
| 2008/0027896 A1 | 1/2008 | Anjur |
| 2008/0028340 A1 | 1/2008 | Davis |
| 2008/0040635 A1 | 2/2008 | Larcheveque |
| 2008/0052287 A1 | 2/2008 | Stanciu |
| 2008/0126402 A1 | 5/2008 | Sitchi et al. |
| 2008/0134162 A1 | 6/2008 | James |
| 2008/0162498 A1* | 7/2008 | Omoigui .................. 707/10 |
| 2008/0189335 A1 | 8/2008 | Sikchi |
| 2008/0195483 A1 | 8/2008 | Moora |
| 2008/0222514 A1 | 9/2008 | Rivers-Moore |
| 2009/0013266 A1 | 1/2009 | Gandhi |
| 2009/0019063 A1 | 1/2009 | Gandhi |
| 2009/0043798 A1* | 2/2009 | Tan et al. .................. 707/102 |
| 2009/0044103 A1 | 2/2009 | Chalecki et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2010/0125778 A1 | 5/2010 | Kelkar |
| 2010/0229110 A1 | 9/2010 | Rockey et al. |
| 2010/0281313 A1 | 11/2010 | White et al. |
| 2011/0173560 A1 | 7/2011 | Larcheveque |
| 2011/0239101 A1 | 9/2011 | Rivers-Moore |
| 2011/0246868 A1 | 10/2011 | Stanciu |
| 2011/0296290 A1 | 12/2011 | Ruthfield |
| 2013/0238967 A1 | 9/2013 | Stanciu et al. |
| 2013/0271409 A1 | 10/2013 | Kim |
| 2013/0275865 A1 | 10/2013 | Kim |

FOREIGN PATENT DOCUMENTS

| | | |
|---|---|---|
| CA | 2533147 | 7/2013 |
| CN | 1536483 | 10/2004 |
| CN | 1636208 | 7/2005 |
| EP | 0173123 | 3/1986 |
| EP | 0841615 | 5/1998 |
| EP | 0961197 | 12/1999 |
| EP | 1076290 | 2/2001 |
| EP | 1221661 | 7/2002 |
| EP | 1997023 | 12/2008 |
| EP | 2325745 | 5/2011 |
| JP | 63085960 | 4/1988 |
| JP | 401173140 | 7/1989 |
| JP | 4225466 | 8/1992 |
| JP | 04290126 | 10/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 08263246 | 10/1996 |
| JP | 08263247 | 10/1996 |
| JP | 09016801 | 1/1997 |
| JP | 09134273 | 5/1997 |
| JP | 09146736 | 6/1997 |
| JP | 09190327 | 7/1997 |
| JP | 09251370 | 9/1997 |
| JP | 09292967 | 11/1997 |
| JP | 10011255 | 1/1998 |
| JP | 10097559 | 4/1998 |
| JP | 10171662 | 6/1998 |
| JP | 10207805 | 8/1998 |
| JP | 10232754 | 9/1998 |
| JP | 10240434 | 9/1998 |
| JP | 10260765 | 9/1998 |
| JP | 2000029713 | 1/2000 |
| JP | 2000132436 | 5/2000 |
| JP | 3191429 | 7/2001 |
| JP | 2002183652 | 6/2002 |
| JP | 2003173288 | 6/2003 |
| JP | 2003296235 | 10/2003 |
| JP | 2003316769 | 11/2003 |
| JP | 2003337648 | 11/2003 |
| JP | 2004501450 | 1/2004 |
| JP | 2004054749 | 2/2004 |
| JP | 2004341675 | 12/2004 |
| JP | 2008547117 | 12/2008 |
| JP | 2009528648 | 8/2009 |
| JP | 2009529185 | 8/2009 |
| JP | 4833490 | 9/2011 |
| RU | 2413987 | 3/2011 |
| TW | 200506661 | 2/2004 |
| TW | I224742 | 12/2004 |
| TW | I364674 | 5/2012 |
| WO | WO-9414115 | 6/1994 |
| WO | WO-9427227 | 11/1994 |
| WO | WO9924945 | 5/1999 |
| WO | WO9956207 | 11/1999 |
| WO | WO-0126018 | 4/2001 |
| WO | WO-0144934 | 6/2001 |
| WO | WO0157720 | 8/2001 |
| WO | WO-0198888 | 12/2001 |

(56) References Cited

FOREIGN PATENT DOCUMENTS

| | | |
|---|---|---|
| WO | WO-0198927 | 12/2001 |
| WO | WO-0198949 | 12/2001 |
| WO | WO-2005089336 | 9/2005 |

OTHER PUBLICATIONS

"Final Office Action", U.S. Appl. No. 11/170,521, (Jun. 29, 2010), 13 pages.
"Final Office Action", U.S. Appl. No. 11/218,149, (May 19, 2010), 17 pages.
"Foreign Office Action", Australian Patent Application No. 2006200285, (May 20, 2010), 2 pages.
"Foreign Office Action", European Patent Application No. 01939368.5, (Feb. 25, 2010), 3 pages.
"Foreign Office Action", Russian Application No. 2006103267, (Apr. 20, 2010), 10 pages.
"Foreign Office Action", Russian Application No. 2006105526, (Apr. 15, 2010), 10 pages.
"Non-Final Office Action", U.S. Appl. No. 11/295,178, (May 26, 2010), 45 pages.
"Non-Final Office Action", U.S. Appl. No. 11/567,140, (May 18, 2010), 8 pages.
"Notice of Allowance", U.S. Appl. No. 10/402,640, (Jun. 15, 2010), 6 pages.
"Notice of Allowance", U.S. Appl. No. 10/916,692, (Jun. 14, 2010), 6 pages.
"Notice of Allowance", U.S. Appl. No. 11/872,703, (May 14, 2010), 18 pages.
"Supplemental Notice of Allowance", U.S. Appl. No. 11/044,106, (May 13, 2010), 6 pages.
"Supplemental Notice of Allowance", U.S. Appl. No. 11/044,106, (May 19, 2010), 5 pages.
"Non-Final Office Action", U.S. Appl. No. 11/170,521, (Dec. 17, 2009), 11 pages.
"Notice of Allowance", U.S. Appl. No. 10/990,152, (Dec. 21, 2009), 6 pages.
Honkala, Mikko et al., "Multimodal Interaction with XForms", *ICWE '06*, (2006), pp. 201-208.
"Final Office Action", U.S. Appl. No. 11/295,178, (Dec. 24, 2009), 38 pages.
"Non-Final Office Action", U.S. Appl. No. 10/402,640, (Dec. 30, 2009), 16 pages.
"Non-Final Office Action", U.S. Appl. No. 12/021,894, (Dec. 31, 2009), 10 pages.
"Non-Final Office Action", U.S. Appl. No. 11/218,149, (Jan. 14, 2010), 15 Pages.
"Notice of Allowance", U.S. Appl. No. 10/955,665, (Dec. 30, 2009), 2 pages.
"Final Office Action", U.S. Appl. No. 11/227,550, (Jan. 19, 2010), 12 pages.
"Final Office Action", U.S. Appl. No. 11/234,767, (Jan. 26, 2010), 23 pages.
"Foreign Office Action", Application Serial No. 200610051544.X, (Dec. 4, 2009), 9 pages.
"Notice of Allowance", U.S. Appl. No. 11/872,703, (Jan. 27, 2010), 19 pages.
"Non Final OA", U.S. Appl. No. 10/939,588, (Feb. 18, 2009), 40 pages.
"Notice of Allowance", U.S. Appl. No. 10/404,312, (Jan. 12, 2009), 12 pages.
"Final Office Action", U.S. Appl. No. 10/857,689, (Jan. 6, 2009), 23 pages.
"Non Final Office Action", U.S. Appl. No. 10/977,198, (Feb. 2, 2009), 15 pages.
"Non Final Office Action", U.S. Appl. No. 10/939,588, (Feb. 18, 2009), 40 pages.
"Non Final Office Action", U.S. Appl. No. 10/976,451, (Feb. 23, 2009), 39 pages.
"Non final Office Action", U.S. Appl. No. 11/234,767, (Feb. 26, 2009), 37 pages.
"Final Office Action", U.S. Appl. No. 11/557,931, (Feb. 26, 2010), 8 pages.
"Foreign Notice of Allowance", Mexican Application No. PA/a/2005/012067, (Nov. 13, 2009), 3 pages.
"Non-Final Office Action", U.S. Appl. No. 11/227,550, (Mar. 10, 2010), 12 pages.
"Notice of Allowance", U.S. Appl. No. 11/044,106, (Mar. 15, 2010), 7 pages.
"Notice of Allowance", U.S. Appl. No. 11/072,087, (Feb. 23, 2010), 4 pages.
"Notice of Allowance", U.S. Appl. No. 11/093,588, (Mar. 10, 2010), 10 pages.
"Supplemental Notice of Allowance", U.S. Appl. No. 10/955,665, (Feb. 4, 2010), 2 pages.
"Supplemental Notice of Allowance", U.S. Appl. No. 10/955,665, (Nov. 27, 2009), 2 pages.
"Supplemental Notice of Allowance", U.S. Appl. No. 10/955,665, (Mar. 5, 2010), 2 pages.
"Validation with MSXML and XML Schema", *Windows Developer Magazine*, (Jan. 1, 2002), 5 pages.
Altova, "XML Spy 4.0 Manual", *1998-2001 Altova Inc. & Altova GmbH*, (Sep. 10, 2001), pp. 1-90, 343-362.
Chen, YA B., et al., "Designing Valid XML Views", S. Spaccapietra, S.T. March, and Y. Kambayashi (Eds.): *ER 2002, LNCS 2503*, Copyright: Springer-Verlag Berlin Heidelberg 2002, pp. 463-477.
Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/0011,(Nov. 4-9, 2002), pp. 446-452.
Chien, Shu-Yao et al., "Efficient Schemes for Managing Multiversion XML Documents", *The VLDB Journal 2002*, (Dec. 19, 2002), pp. 332-353.
Cover, Robin "XML Forms Architecture (XFA)", Cover Pages. Retrieved from "http://xml.coverpages.org/xfa.html" on Aug. 17, 2006, (Apr. 19, 2000), 4 pages.
Hardy, Matthew R., et al., "Mapping and Displaying Structural Transformations between XML and PDF", *Proceedings of the 2002 ACM symposium on Document engineering*, (Nov. 8-9, 2002), pp. 95-102.
Rogge, Boris et al., "Validating MPEG-21 Encapsulated Functional Metadata", *IEEE 2002*, ISBN 0-7803-7304-9/02,(2002), pp. 209-212.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Offfice Action", U.S. Appl. No. 11/170,521, (Jan. 21, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Notice of Allowance", U.S. Appl. No. 10/988,718, (Apr. 9, 2009).
"Final Office Action", U.S. Appl. No. 11/107,347, (Apr. 2, 2009),15 pages.
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, 19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.

(56) References Cited

OTHER PUBLICATIONS

"Final Office Action", U.S. Appl. No. 11/107,347, (Mar. 22, 2010),11 pages.
"Non-Final Office Action", U.S. Appl. No. 10/402,640, (Apr. 30, 2010),4 pages.
"Non-Final Office Action", U.S. Appl. No. 10/916,692, (Apr. 5, 2010),6 pages.
"Non-Final Office Action", U.S. Appl. No. 10/976,451, (Apr. 9, 2010),11 pages.
"Notice of Allowance", U.S. Appl. No. 11/557,931, (May 5, 2010),7 pages.
"Supplemental Notice of Allowance", U.S. Appl. No. 10/990,152, (Apr. 19, 2010),2 pages.
"Supplemental Notice of Allowance", U.S. Appl. No. 11/072,087, (Apr. 19, 2010),2 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Sever BH Series Operating System Guide", Hewlett-Packard,(Jul. 2002).
"Non Final Office Action", U.S. Appl. No. 09/599,809, (May 13, 2009).
"Non Final Office Action", U.S. Appl. No. 11/295,178.
"Non Final Office Action", U.S. Appl. No. 10/990,152.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, 24 pages.
"Foreign Office Action", Application Serial No. 2002-503702, Final Notice of Rejection,(Jun. 5, 2009),212 pages.
Kaori, Iwantani et al., "Perfect Manual of Clarisworks 4.0 for Macintosh", 1st Edition, Japan,(Jul. 22, 1997),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative—Looking but 'Attentive' New Function", NIKKEI PC 21, vol. 4, No. 8,(Aug. 1, 1999),pp. 115-116.
Yasuji, Fukuhara "Clarisworks, Introduction to Business Document Construction, No. 4, Estimate", NIKKEI MAC, No. 14,(May 17, 1994),pp. 197-204.
"Final Office Action", U.S. Appl. No. 10/976,451 (Jul. 2, 2009), 22 pages.
Reagan, Moore W., et al., "Collection-based persistent digital archives", U.S. Appl. No. 60/191,662, filed Mar. 23, 2000, 133.
"European Search Report", EP Application No. 06111546.5, (Nov. 9, 2006),5 pages.
"Final Office Action", U.S. Appl. No. 10/402,640, (Sep. 10, 2007),16 pages.
"Final Office Action", U.S. Appl. No. 10/955,087, (May 16, 2008),13 pages.
"Final Office Action", U.S. Appl. No. 10/955,666, (Oct. 31, 2008),24 pages.
"Final Office Action", U.S. Appl. No. 10/955,666, (Aug. 30, 2007),19 pages.
"Final Office Action", U.S. Appl. No. 10/976,451, (Jul. 27, 2010),12 pages.
"Final Office Action", U.S. Appl. No. 10/977,198, (Sep. 3, 2008),13 pages.
"Final Office Action", U.S. Appl. No. 10/977,198, (Oct. 11, 2007),10 pages.
"Final Office Action", U.S. Appl. No. 10/988,718, (Jan. 30, 2008),15 pages.
"Final Office Action", U.S. Appl. No. 10/988,718, (Dec. 22, 2008),17 pages.
"Final Office Action", U.S. Appl. No. 10/988,732, (Nov. 13, 2009),33 pages.
"Final Office Action", U.S. Appl. No. 10/988,732, (Dec. 10, 2008),29 pages.
"Final Office Action", U.S. Appl. No. 11/012,472, (Mar. 23, 2010),10 pages.
"Final Office Action", U.S. Appl. No. 11/227,550, (Aug. 19, 2010),12 pages.
"Final Office Action", U.S. Appl. No. 11/295,178, (Jul. 30, 2010),43 pages.
"Final Office Action", U.S. Appl. No. 11/567,140, (Aug. 19, 2010),10 pages.
"Foreign Office Action", Chinese Application No. 200610051554.X, (Jun. 25, 2010),10 pages.
"Foreign Office Action", EP Application No. 01935325.9, (Jul. 20, 2010),6 pages.
"Foreign Office Action", Japanese Application No. 2002-530701, (Aug. 10, 2010),11 pages.
"Issue Notification", U.S. Appl. No. 10/955,087, (Mar. 18, 2009),1 page.
"Issue Notification", U.S. Appl. No. 10/988,718, (Aug. 12, 2009),1 page.
"Issue Notification", U.S. Appl. No. 11/095,254, (Feb. 10, 2010),1 page.
"Issue Notification", U.S. Appl. No. 11/276,585, (Jan. 21, 2009),1 page.
"Lotus Notes Release 5, Step by Step", *Lotus Development Corporation*, (1999),224 pages.
"Netscape Window", *Netscape Screenshot*, (Oct. 2, 2002),1 page.
"Non Final Office Action", U.S. Appl. No. 10/402,640, (Oct. 6, 2006),15 pages.
"Non Final Office Action", U.S. Appl. No. 10/402,640, (Feb. 12, 2008),16 pages.
"Non Final Office Action", U.S. Appl. No. 10/402,640, (Apr. 25, 2007),16 pages.
"Non Final Office Action", U.S. Appl. No. 10/402,640, (Sep. 8, 2008),16 pages.
"Non Final Office Action", U.S. Appl. No. 10/955,087, (Nov. 19, 2007),22 pages.
"Non Final Office Action", U.S. Appl. No. 10/955,666, (Dec. 26, 2006),20 pages.
"Non Final Office Action", U.S. Appl. No. 10/955,666, (Feb. 4, 2008),20 pages.
"Non Final Office Action", U.S. Appl. No. 10/977,198, (Jan. 10, 2008),10 pages.
"Non Final Office Action", U.S. Appl. No. 10/977,198, (Mar. 9, 2007),9 pages.
"Non Final Office Action", U.S. Appl. No. 10/988,718, (Jan. 25, 2007),13 pages.
"Non Final Office Action", U.S. Appl. No. 10/988,718, (Jul. 21, 2008),18 pages.
"Non Final Office Action", U.S. Appl. No. 10/988,718, (Jul. 26, 2007),21 pages.
"Non-Final Office Action", U.S. Appl. No. 10/854,961, (Nov. 15, 2006),21 pages.
"Non-Final Office Action", U.S. Appl. No. 10/955,665, (Sep. 11, 2008),16 pages.
"Non-Final Office Action", U.S. Appl. No. 10/988,732, (Apr. 1, 2008),27 pages.
"Non-Final Office Action", U.S. Appl. No. 10/988,732, (May 26, 2010),36 pages.
"Non-Final Office Action", U.S. Appl. No. 10/988,732, (Jun. 11, 2009),30 pages.
"Non-Final Office Action", U.S. Appl. No. 11/012,472, (Oct. 6, 2009),8 pages.
"Non-Final Office Action", U.S. Appl. No. 11/012,472, (Jul. 1, 2010),9 pages.
"Non-Final Office Action", U.S. Appl. No. 11/036,910, (Aug. 19, 2010),8 pages.

(56) References Cited

OTHER PUBLICATIONS

"Non-Final Office Action", U.S. Appl. No. 11/107,347, (Jul. 9, 2010),16 pages.
"Notice of Allowance", U.S. Appl. No. 10/854,961, (Jun. 14, 2007),12 pages.
"Notice of Allowance", U.S. Appl. No. 10/955,087, (Dec. 11, 2008),10 pages.
"Restriction Requirement", U.S. Appl. No. 10/402,640, (Aug. 29, 2006),5 pages.
"Restriction Requirement", U.S. Appl. No. 11/012,472, (Jun. 9, 2009),7 pages.
Burch, Barbara "Notes R5 Technical Overview", Retrieved from: <http://www.ibm.com/developerworks/lotus/library/1s-Notes_R5_Technical_Overview> on Aug. 13, 2010, (Apr. 1, 1999),14 pages.
Esposito, Dino "Cutting Edge No. 8", *Microsoft Internet Developer*, (Jan. 18, 2000),13 pages.
Howlett, Scott "A New Function for SQL Server 2000", *MSDN Magazine*, No. 1, (Apr. 18, 2000),11 pages.
"Final Office Action", U.S. Appl. No. 10/402,640, (Aug. 28, 2009), 17 pages.
"Final Office Action", U.S. Appl. No. 10/942,528, (Sep. 17, 2009), 27 pages.
"Final Office Action", U.S. Appl. No. 11/170,521, (Sep. 8, 2009), 12 pages.
"Final Office Action", U.S. Appl. No. 10/977,198, (Aug. 19, 2009), 15 pages.
"Foreign Office Action", Application Serial No. 200610051554.X, (Jul. 10, 2009), 11 pages.
"Non-Final Office Action", U.S. Appl. No. 10/939,588, (Aug. 27, 2009), 28 pages.
"Non-Final Office Action", U.S. Appl. No. 11/044,106, (Sep. 24, 2009), 17 pages.
"Non-Final Office Action", U.S. Appl. No. 11/107,347, (Sep. 17, 2009), 9 pages.
"Non-Final Office Action", U.S. Appl. No. 11/234,767, (Aug. 12, 2009), 24 Pages.
"Non-Final Office Action", U.S. Appl. No. 11/227,550, (Aug. 3, 2009), 10 pages.
"Notice of Allowance", U.S. Appl. No. 10/988,720, (Sep. 17, 2009), 18 pages.
"Notice of Allowance", U.S. Appl. No. 11/203,937, (Aug. 3, 2009), 7 pages.
"Notice of Allowance", U.S. Appl. No. 11/203,937, (Aug. 31, 2009), 2 pages.
"Notice of Allowance", U.S. Appl. No. 11/203,937, Supplemental,(Sep. 15, 2009), 2 pages.
"Non-Final Office Action", U.S. Appl. No. 11/567,149, (Sep. 8, 2009), 5 pages.
"Final Office Action", U.S. Appl. No. 10/955,666, (Oct. 14, 2009), 24 pages.
"Advisory Action", U.S. Appl. No. 10/942,528, (Oct. 26, 2009), 3 pages.
"Non-Final Office Action", U.S. Appl. No. 11/557,931, (Oct. 20, 2009), 27 pages.
"Non-Final Office Action", U.S. Appl. No. 10/976,451, (Oct. 29, 2009), 14 pages.
Webopedia, "Definition of OLE", Retrieved from: <http://www.webopedia.com/TERM/O/OLE.html>, (May 16, 1998), 3 pages.
Webopedia, "Definition of OpenDoc", Retrieved from: <http://www.webopedia.com/TERM/O/OpenDoc.html>, (Sep. 18, 1997), 3 pages.
Webopedia, "Definition of Network", Retrieved from: <http://www.webopedia.com/TERM/n/network.html>, (Sep. 1, 1996), 2 pages.
"Notice of Allowance", U.S. Appl. No. 10/955,665, (Nov. 3, 2009), 8 pages.
"Final Office Action", U.S. Appl. No. 10/916,692, (Nov. 16, 2009), 10 pages.
"Final Office Action", U.S. Appl. No. 11/218,149, (Nov. 16, 2009), 18 pages.
"Final Office Action", U.S. Appl. No. 11/072,087, (Nov. 16, 2009), 9 pages.
"Non-Final Office Action", U.S. Appl. No. 11/036,910, (Nov. 13, 2009), 9 pages.
"Notice of Allowance", U.S. Appl. No. 11/095,254, (Nov. 18, 2009), 8 pages.
"Foreign Office Action", Mexican Patent Application No. PA/a/2006/002493, (Sep. 14, 2009), 5 pages.
"Notice of Allowance", U.S. Appl. No. 10/942,528, (Dec. 3, 2009), 8 pages.
"Notice of Allowance", U.S. Appl. No. 11/056,500, (Dec. 2, 2009), 17 pages.
"Final Office Action", U.S. Appl. No. 10/976,451, (Apr. 6, 2011),10 pages.
"Final Office Action", U.S. Appl. No. 11/234,767, (Mar. 10, 2011),28 pages.
"Mott Porous Metal. The Most Reliable Means of Restricting Gas Flow", *Mott Corporation Webpage*, retrieved from <<http://www.mottcorp.com/industry/oem/oem_flowres.htm>> on Aug. 23, 2004, 4 pages.
"Non Final Office Action", U.S. Appl. No. 11/567,140, (Feb. 18, 2011),8 pages.
"Non-Final Office Action", U.S. Appl. No. 11/927,296, (Mar. 4, 2011),19 pages.
"Notice of Allowance", U.S. Appl. No. 11/295,178, (Mar. 22, 2011),20 pages.
"Supplemental Notice of Allowance", U.S. Appl. No. 11/218,149, (Apr. 5, 2011),2 pages.
"Supplemental Notice of Allowance", U.S. Appl. No. 11/931,730, (Mar. 2, 2011),2 pages.
Prosise, Jeff "Programming Microsoft Net", retrieved from: <http://academic.safaribooksonline.com/print?xmlid=0-7356-1376-1/IDAVO3T> on Mar. 3, 2011, Microsoft Press,(May 15, 2002),24 pages.
Reilly, Douglas J., "Programming Microsoft Web Forms", retrieved from: <http://academic.safaribooksonline.com/print?xmlid=0735621799/systemdotwebdotuidotweb> on Mar. 3, 2011, Microsoft Press,(Nov. 2, 2005),52 pages.
"Adobe GoLive 5.0: User Guide, Adobe Systems, 2000, Chapter 12.", (2000), 11 pages.
"Advisory Action", U.S. Appl. No. 11/036,910, (Sep. 10, 2009), 3 pages.
"European Search Report", EP Application No. 10012887.5, (Jul. 4, 2011), 12 pages.
"Final Office Action", U.S. Appl. No. 10/938,476, (Jun. 20, 2011), 19 pages.
"Final Office Action", U.S. Appl. No. 12/126,532, (Oct. 14, 2011), 25 pages.
"Foreign Notice of Allowance", Canadian Application No. 2412611, (Sep. 19, 2011), 1 page.
"Foreign Notice of Allowance", Japanese Application No. 2002-504581, (Sep. 16, 2011), 6 pages.
"Foreign Office Action", Canadian Application No. 2408527, (Sep. 27, 2011), 3 pages.
"Foreign Office Action", Japanese Application No. 2002-503700, (Aug. 30, 2011), 4 pages.
"Foreign Office Action", Japanese Application No. 2002-504581, (Dec. 17, 2010), 24 pages.
"Foreign Office Action", Japanese Application No. 2002-504581, (May 27, 2011), 6 pages.
"Foreign Office Action", Japanese Application No. 2006-060050, (Aug. 26, 2011), 4 pages.
"Non-Final Office Action", U.S. Appl. No. 10/011,150, (May 19, 2005), 7 pages.
"Non-Final Office Action", U.S. Appl. No. 11/036,910, (Oct. 2, 2008), 7 pages.
"Notice of Allowance", U.S. Appl. No. 10/011,150, (Dec. 16, 2005), 4 pages.
"Notice of Allowance", U.S. Appl. No. 11/567,140, (Oct. 11, 2011), 11 pages.
"Notice of Allowance", U.S. Appl. No. 12/249,973, (Sep. 28, 2011), 9 pages.

(56) References Cited

OTHER PUBLICATIONS

"Restriction Requirement", U.S. Appl. No. 10/011,150, (Dec. 15, 2004), 5 pages.
"Supplementary European Search Report", Application No. 04779161.1, (Jul. 14, 2011), 4 pages.
"TEI: P4 Guidelines", *TEI Consortium*, (Mar. 2002), 340 pages.
"Text Encoding Initiative", *TEI Consortium*, (Mar. 2002), 1 page.
Duce, et al., "Web 2D Graphics File Formats", *Google 2003*, (2003), pp. 43-65.
Idle, et al., "Outline of the International Standard Linguistic Annotation Framework", *Proceedings of the ACL 2003 workshop on Linguistic Annotation*, (Jul. 2003), 5 pages.
Mengel, A et al., "MATE Dialogue Annotation Guidelines", http://www.ims.uni-stuttgart.de/projekte/mate/mdag, (Jan. 8, 2000), 64 pages.
Zdonik, Stanley B., "Object Management System Concepts", *Supporting Integrated Office Workstation Applications, Doctoral Thesis*, Massachusetts Institute of Technology, (1983), 262 pages.
"Advisory Action", U.S. Appl. No. 10/185,048, (Jun. 20, 2006), 3 Pages.
"Advisory Action", U.S. Appl. No. 10/185,048, (Sep. 16, 2005), 3 Pages.
"Advisory Action", U.S. Appl. No. 10/632,437, (Aug. 23, 2006), 3 pages.
"Advisory Action", U.S. Appl. No. 10/898,657, (Mar. 25, 2008), 3 pages.
"Advisory Action", U.S. Appl. No. 10/916,692, (Dec. 10, 2008), 3 Pages.
"Advisory Action", U.S. Appl. No. 11/276,584, (Apr. 17, 2009), 3 pages.
"Applicants' Statement Regarding a Non-Public Use", (May 31, 2006), 1 page.
"Attensa Outlook—Getting Started", www.attensa.com, (2005), pp. 1-33.
"Blogdigger—Add Feed Form", *Internet Resource*, Retrieved from <http://web.archive.org/web/20050618015745/http://www.blogdigger.com/add.jsp> on Nov. 13, 2008 1 of> on Nov. 13, 2008, 1 page.
"Bradbury Software FeedDemon 1.0", (May 26, 2004), 3 pages.
"The Search Form to Services-based Web Sites", *Cybook, Inc.*, the whole document, (Jul. 26, 2004), 1 page.
"EP Search Report", Application No. 07751586.4, (Aug. 13, 2009), 9 pages.
"EP Search Report", Application Serial No. 07750552.7, EESR, (Sep. 30, 2009), 6 pages.
"EP Search Report", EP Application No. 00306806, (Jul. 16, 2003), 3 pages.
"EP Search Report", EP Application No. 05112241.4, (Mar. 18, 2010), 10 pages.
"EP Search Report", EP Application No. 97307138, (Mar. 21, 2003), 3 pages.
"Feed Splicing, Part 1", Retrieved from: <http://blogs.feedburner.com/feedburner/archives/2004/07/feed_splicing_part_i.php> on Jul. 14, 2004, 5 pages.
"Feed Splicing, Part 2", Retrieved from <http://blogs.feedburner.com/feedburner/archives/2004/08feed_splicing_part_ii.php> on Dec. 8, 2008, (Aug. 16, 2004), 5 pages.
"FeedBurner", Retrieved from <http://www.feedburner.com> on Dec. 8, 2008, (Feb. 25, 2004), 1 Page.
"Final Office Action", U.S. Appl. No. 09/599,086, (Mar. 6, 2008), 47 pages.
"Final Office Action", U.S. Appl. No. 09/599,086, (May 10, 2007), 41 pages.
"Final Office Action", U.S. Appl. No. 09/599,086, (May 25, 2004), 23 pages.
"Final Office Action", U.S. Appl. No. 09/599,086, (Jul. 5, 2006), 34 pages.
"Final Office Action", U.S. Appl. No. 09/599,086, (Aug. 8, 2005), 27 pages.
"Final Office Action", U.S. Appl. No. 09/599,299, (Apr. 20, 2004), 23 pages.
"Final Office Action", U.S. Appl. No. 09/599,812, (Aug. 12, 2003), 38 pages.
"Final Office Action", U.S. Appl. No. 10/178,291, (Dec. 19, 2005), 21 pages.
"Final Office Action", U.S. Appl. No. 10/185,048, (Mar. 13, 2006), 14 Pages.
"Final Office Action", U.S. Appl. No. 10/185,048, (Jun. 3, 2005), 14 Pages.
"Final Office Action", U.S. Appl. No. 10/632,437, (Jan. 25, 2008), 25 pages.
"Final Office Action", U.S. Appl. No. 10/632,437, (Jun. 1, 2006), 21 pages.
"Final Office Action", U.S. Appl. No. 10/723,188, (Jan. 9, 2009), 20 pages.
"Final Office Action", U.S. Appl. No. 10/723,863, (Sep. 19, 2007), 34 Pages.
"Final Office Action", U.S. Appl. No. 10/781,586, (Aug. 9, 2007), 20 pages.
"Final Office Action", U.S. Appl. No. 10/846,428, (Mar. 3, 2008), 23 pages.
"Final Office Action", U.S. Appl. No. 10/876,418, (May 22, 2008), 14 pages.
"Final Office Action", U.S. Appl. No. 10/897,647, (Mar. 6, 2008), 25 pages.
"Final Office Action", U.S. Appl. No. 10/897,647, (Jul. 14, 2009), 36 pages.
"Final Office Action", U.S. Appl. No. 10/898,656, (Nov. 15, 2007), 16 pages.
"Final Office Action", U.S. Appl. No. 10/898,657, (Jan. 3, 2008), 21 pages.
"Final Office Action", U.S. Appl. No. 10/916,692, (Oct. 2, 2008), 10 Pages.
"Final Office Action", U.S. Appl. No. 10/988,732, (Nov. 12, 2010), 37 pages.
"Final Office Action", U.S. Appl. No. 11/095,254, (Dec. 22, 2008), 9 pages.
"Final Office Action", U.S. Appl. No. 11/158,398, (Oct. 15, 2010), 11 pages.
"Final Office Action", U.S. Appl. No. 11/158,398, (Feb. 25, 2009), 12 pages.
"Final Office Action", U.S. Appl. No. 11/158,398, (Mar. 22, 2010), 11 pages.
"Final Office Action", U.S. Appl. No. 11/158,911, (Oct. 15, 2010), 13 pages.
"Final Office Action", U.S. Appl. No. 11/158,911, (Oct. 28, 2009), 10 pages.
"Final Office Action", U.S. Appl. No. 11/158,936, (Jun. 26, 2009), 16 pages.
"Final Office Action", U.S. Appl. No. 11/158,936, (Jul. 19, 2010), 14 pages.
"Final Office Action", U.S. Appl. No. 11/276,536, (Apr. 23, 2010), 20 pages.
"Final Office Action", U.S. Appl. No. 11/276,584, (Oct. 29, 2009), 12 pages.
"First Office Action", Chinese Application No. 200780007512.9, (Jan. 15, 2010), 7 pages.
"First Office Action", Chinese Application No. 200780008302.1, (Jan. 8, 2010), 15 pages.
"flaggeditems.png", *Print screen from Internet Search*, Retrieved from <http://web.archive.org/web/20050623095655/http://ranchero.com/images/nnw2/flaggeditems.png> on Nov. 13, 2008, 1 page.
"Foreign Decision of Grant", Russian Application No. 2006103267, (Aug. 13, 2010), 18 pages.
"Foreign Decision of Grant", Russian Application No. 2006105526, (Nov. 8, 2010), 16 pages.
"Foreign Office Action", Application Serial No. 07750552.7, (Nov. 17, 2009), 6 pages.
"Foreign Office Action", Application Serial No. 200680018421.0, (Jan. 9, 2009), 10 pages.
"Foreign Office Action", Australian Application No. 2006262540, (Oct. 8, 2010), 1 page.

(56) References Cited

OTHER PUBLICATIONS

"Foreign Office Action", Canadian Application No. 2408313, (Oct. 26, 2010),5 pages.
"Foreign Office Action", Canadian Application No. 2412611, (Oct. 26, 2010),2 pages.
"Foreign Office Action", Chinese Application No. 200680018421.0, (Jun. 24, 2010),11 pages.
"Foreign Office Action", Chinese Application No. 200680018421.0, (Sep. 3, 2010),9 pages.
"Foreign Office Action", Chinese Application No. 200680021415.0, (Jun. 8, 2010),10 pages.
"Foreign Office Action", EP Application No. 05112241.4, (Dec. 23, 2010),6 pages.
"Foreign Office Action", European Patent Application No. 01939034.3, (Nov. 5, 2007),3 pages.
"Foreign Office Action", Japanese Application 2002-504575, (Dec. 14, 2010),4 pages.
"Foreign Office Action", Russian Application No. 2006105526, (Aug. 24, 2010),5 pages.
"Google Reader: beta feed reader", Retrieved from <http://www.consumingexperience.com/2005/10/google-reader-beta-feed-reader.html,(Oct. 7, 2005),8 pages.
"Google Reader: Reviewers Guide", Available at: <http://www.google.com/press/guides/reader_overview.pdf>, (Oct. 16, 2005),pp. 1-5.
"Introduction to RSS", Retrieved from: <http://www.webreference.com/authoring/languages/xml/rss/intro.> on Jan. 28, 2008, (Mar. 27, 2000),3 Pages.
"JP Notice of Publication", Application Serial No. 2008-558275, (Aug. 6, 2009),2 pages.
"JP Notice of Publication", Application Serial No. 2008-558294, (Aug. 13, 2009),2 pages.
"Kalsey_Blogfeed", *Internet Article*, Retrieved from <http://web.archive.org/web/20050515005125/http://www.kalsey.com/tools/blogfeed/> on Nov. 13, 2008,pp. 1-3.
"mainWindow2.png", *Print Screen from Internet Article*, Retrieved from <http://web.archive.org/web/20050623095300/http://ranchero.com/images/nnw2/mainWindow2.png> on Nov. 13, 2008,1 page.
"Manual of Patent Office Practice", *Computer-Implemented Inventions*, Chapter.16.09.02, *Data Structures*, (Oct. 2010),3 pages.
"Microsoft Computer Dictionary 5th Edition", *Entry for "Stack," Microsoft Press*, ISBN 0-7356-1495-4, (May 1, 2002),p. 495.
"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008,pp. 1-3.
"Non Final Office Action", U.S. Appl. No. 09/599,086, (Jan. 30, 2006),33 pages.
"Non Final Office Action", U.S. Appl. No. 09/599,086, (Oct. 28, 2003),21 pages.
"Non Final Office Action", U.S. Appl. No. 09/599,086, (Oct. 31, 2007),48 pages.
"Non Final Office Action", U.S. Appl. No. 09/599,086, (Nov. 13, 2006),33 pages.
"Non Final Office Action", U.S. Appl. No. 09/599,086, (Nov. 14, 2008),55 pages.
"Non Final Office Action", U.S. Appl. No. 09/599,086, (Mar. 3, 2005),25 pages.
"Non Final Office Action", U.S. Appl. No. 09/599,806, (Mar. 12, 2003),7 pages.
"Non Final Office Action", U.S. Appl. No. 09/599,806, (Aug. 17, 2004),5 pages.
"Non Final Office Action", U.S. Appl. No. 10/178,291, (Nov. 26, 2004),21 pages.
"Non Final Office Action", U.S. Appl. No. 10/178,291, (Apr. 29, 2004),14 pages.
"Non Final Office Action", U.S. Appl. No. 10/178,291, (Jun. 27, 2005),22 pages.
"Non Final Office Action", U.S. Appl. No. 10/395,505, (Sep. 11, 2006),8 pages.
"Non Final Office Action", U.S. Appl. No. 10/632,437, (Dec. 16, 2005),22 pages.
"Non Final Office Action", U.S. Appl. No. 10/632,437, (Jul. 26, 2007),19 pages.
"Non Final Office Action", U.S. Appl. No. 10/632,437, (Sep. 10, 2008),28 pages.
"Non Final Office Action", U.S. Appl. No. 10/770,240, (May 1, 2008),30 pages.
"Non Final Office Action", U.S. Appl. No. 10/770,240, (Aug. 24, 2004),25 pages.
"Non Final Office Action", U.S. Appl. No. 10/897,647, (Nov. 14, 2008),28 pages.
"Non Final Office Action", U.S. Appl. No. 10/897,647, (Sep. 6, 2007),21 pages.
"Non Final Office Action", U.S. Appl. No. 10/898,656, (Apr. 18, 2008),17 pages.
"Non Final Office Action", U.S. Appl. No. 10/898,656, (Jul. 13, 2007),13 pages.
"Non Final Office Action", U.S. Appl. No. 10/898,657, (Jul. 18, 2007),18 pages.
"Non Final Office Action", U.S. Appl. No. 10/898,657, (Sep. 8, 2008),24 pages.
"Non Final Office Action", U.S. Appl. No. 11/158,911, (Jun. 30, 2009),9 pages.
"Non Final Office Action", U.S. Appl. No. 11/276,536, (Jan. 9, 2009),33 pages.
"Non Final Office Action", U.S. Appl. No. 11/276,536, (May 28, 2009),18 pages.
"Non Final Office Action", U.S. Appl. No. 11/276,584, (Jun. 25, 2009),11 pages.
"Non-Final Office Action", U.S. Appl. No. 09/599,299, (Oct. 28, 2003),32 pages.
"Non-Final Office Action", U.S. Appl. No. 09/599,299, (Aug. 12, 2004),12 pages.
"Non-Final Office Action", U.S. Appl. No. 09/599,812, (Feb. 27, 2003),20 pages.
"Non-Final Office Action", U.S. Appl. No. 09/599,812, (Feb. 5, 2004),35 pages.
"Non-Final Office Action", U.S. Appl. No. 10/185,048, (Dec. 8, 2004),14 Pages.
"Non-Final Office Action", U.S. Appl. No. 10/610,504, (Mar. 9, 2006),12 Pages.
"Non-Final Office Action", U.S. Appl. No. 10/723,863, (Feb. 8, 2007),30 Pages.
"Non-Final Office Action", U.S. Appl. No. 10/723,863, (Aug. 23, 2006),16 Pages.
"Non-Final Office Action", U.S. Appl. No. 10/723,863, (Nov. 6, 2007),7 Pages.
"Non-Final Office Action", U.S. Appl. No. 10/781,586, (Oct. 20, 2006),21 pages.
"Non-Final Office Action", U.S. Appl. No. 10/846,428, (Oct. 15, 2008),23 pages.
"Non-Final Office Action", U.S. Appl. No. 10/846,428, (Jul. 19, 2007),19 pages.
"Non-Final Office Action", U.S. Appl. No. 10/871,586, (Jan. 9, 2008),22 pages.
"Non-Final Office Action", U.S. Appl. No. 10/876,418, (Sep. 13, 2007),14 pages.
"Non-Final Office Action", U.S. Appl. No. 10/916,692, (Apr. 1, 2008),9 Pages.
"Non-Final Office Action", U.S. Appl. No. 10/976,451, (Nov. 10, 2010),9 pages.
"Non-Final Office Action", U.S. Appl. No. 11/095,254, (Apr. 17, 2008),8 pages.
"Non-Final Office Action", U.S. Appl. No. 11/158,398, (Sep. 8, 2009),9 pages.
"Non-Final Office Action", U.S. Appl. No. 11/158,398, (May 13, 2010),10 pages.
"Non-Final Office Action", U.S. Appl. No. 11/158,911, (Jun. 10, 2010),11 pages.

(56) References Cited

OTHER PUBLICATIONS

"Non-Final Office Action", U.S. Appl. No. 11/158,936, (Jan. 12, 2010),12 pages.
"Non-Final Office Action", U.S. Appl. No. 11/218,149, (Sep. 20, 2010),15 pages.
"Non-Final Office Action", U.S. Appl. No. 11/234,767, (Nov. 26, 2010),28 pages.
"Non-Final Office Action", U.S. Appl. No. 11/276,536, (Oct. 7, 2009),15 pages.
"Non-Final Office Action", U.S. Appl. No. 11/276,536, (Sep. 15, 2010),13 pages.
"Non-Final Office Action", U.S. Appl. No. 11/276,584, (Dec. 28, 2009),12 pages.
"Non-Final Office Action", U.S. Appl. No. 11/276,584, (Jul. 26, 2010),14 pages.
"Non-Final Office Action", U.S. Appl. No. 12/028,651, (Jan. 3, 2011),16 pages.
"Non-Final Office Action", U.S. Appl. No. 12/234,449, (Oct. 27, 2010),8 pages.
"Non-Final Office Action", U.S. Appl. No. 12/234,449, (Jun. 1, 2010),8 pages.
"Non-Final Office Action", U.S. Appl. No. 11/234,767, (Aug. 12, 2009),24 pages.
"Notice of Allowance", U.S. Appl. No. 09/599,086, (Aug. 17, 2009),59 pages.
"Notice of Allowance", U.S. Appl. No. 09/599,299, (Nov. 30, 2004),7 pages.
"Notice of Allowance", U.S. Appl. No. 09/599,806, (Jan. 21, 2005),9 pages.
"Notice of Allowance", U.S. Appl. No. 09/599,812, (Aug. 3, 2004),12 pages.
"Notice of Allowance", U.S. Appl. No. 10/178,291, (Feb. 6, 2006),7 pages.
"Notice of Allowance", U.S. Appl. No. 10/395,505, (Oct. 4, 2006),8 pages.
"Notice of Allowance", U.S. Appl. No. 10/610,504, (Sep. 6, 2006),4 Pages.
"Notice of Allowance", U.S. Appl. No. 10/632,437, (May 21, 2009),15 pages.
"Notice of Allowance", U.S. Appl. No. 10/723,863, (Jun. 30, 2008),9 Pages.
"Notice of Allowance", U.S. Appl. No. 10/781,586, (May 9, 2008),6 pages.
"Notice of Allowance", U.S. Appl. No. 10/846,428, (Apr. 29, 2009),10 pages.
"Notice of Allowance", U.S. Appl. No. 10/876,418, (Dec. 31, 2008),8 pages.
"Notice of Allowance", U.S. Appl. No. 10/897,647, (Jan. 19, 2010),13 pages.
"Notice of Allowance", U.S. Appl. No. 10/898,656, (Jan. 2, 2009),9 pages.
"Notice of Allowance", U.S. Appl. No. 10/898,657, (Jun. 11, 2009),20 pages.
"Notice of Allowance", U.S. Appl. No. 11/012,472, (Nov. 24, 2010),6 pages.
"Notice of Allowance", U.S. Appl. No. 11/036,910, (Dec. 7, 2010),7 pages.
"Notice of Allowance", U.S. Appl. No. 11/107,347, (Dec. 13, 2010),11 pages.
"Notice of Allowance", U.S. Appl. No. 11/218,149, (Feb. 11, 2011),7 pages.
"Notice of Allowance", U.S. Appl. No. 11/931,730, (Feb. 2, 2011),7 pages.
"Notice of Allowance", U.S. Appl. No. 12/021,894, (Oct. 29, 2010),9 pages.
"PCT Search Report and Written Opinion", Application No. PCT/US06/23336, (Oct. 29, 2007),8 pages.
"PCT Search Report", PCT Application No. PCT/IB98/01392, (Apr. 9, 1999),3 pages.
"PCT Search Report", PCT Application No. PCT/IB99/02003, (Nov. 28, 2000),3 pages.
"PCT Search Report", PCT Application No. PCT/US01/15581, (Jan. 29, 2003),3 pages.
"PCT Search Report", PCT Application No. PCT/US99/09620, (Sep. 22, 1999),3 pages.
"Persistence.png", *Print Screen from Internet Article*, Retrieved from <http://web.archive.org/web/20050623095937/http://ranchero.com/images/nnw2/persistence.png> on Nov. 13, 2008,1 page.
"Protecting Commercial Secure Web Servers from Key-Finding Threats", *nCipher, Inc.*, Available at <www.ncipher.com/uploads/resources/pcws.pdf>,(1999),12 pages.
"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008,pp. 1-3.
"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008,pp. 1-4.
"Ranchero_Software NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008,pp. 1-3.
"Ranchero Software_Smart Lists", *Internet Article*, Retrieved from <http://web.archive.org/web/20050602084724/http://ranchero.com/netnewswire/features/smartLists.php> on Nov. 13, 2008,pp. 1-2.
"Ranchero Software_Subscription Sharing", *Internet Article*, Retrieved from <http://web.archive.org/web/20050811083741/http://ranchero.com/netnewswire/features/sharing.php> on Nov. 13, 2008,pp. 1-3.
"Ranchero Software Search Engine Subscriptions", *On-line Article*, Retrieved from <http://web.archive.org/web/20050714082710/http://ranchero.com/netnewswire/features/searchEngineSubscriptions.php> on Nov. 13, 2008,pp. 1-2.
"Ranchero Software: NetNewsWire", *Internet Article*, Retrieved from <http://web.archive.org/web/20051003204517/ranchero.com/netnewswire/> on Nov. 13, 2008,(2005),5 pages.
"Ranchero Software: What's New in NetNewsWire 2.0", *Web article*, retrieved from <http://web.archive.org/web/20050618014501/http://ranchero.com/netnewswire/whatsnew/netnewswire20.php> on Nov. 13, 2008,pp. 1-3.
"Ranchero Software_Flagged Items", *Internet Article*, Retrieved from <http://web.archive.org/web/20050612083011/http://ranchero.com/netnewswire/features/flaggedItems.php> on Nov. 13, 2008,1 page.
"Rancho Software_Features Chart", *Internet Article*, Retrieved from <http://web.archive.org/web/20050609010027/http://ranchero.com/netnewswire/featureschart20.php> on Nov. 13, 2008,pp. 1-3.
"Restriction Requirement", U.S. Appl. No. 09/599,806, (Mar. 3, 2003),5 pages.
"Restriction Requirement", U.S. Appl. No. 10/770,240, (Jan. 26, 2009),7 pages.
"Restriction Requirement", U.S. Appl. No. 10/781,586, (Jun. 26, 2006),5 pages.
"Restriction Requirement", U.S. Appl. No. 11/095,254, (Nov. 1, 2007),8 pages.
"RSS 2.0 Specification", (Jul. 15, 2003),1-8.
"RSS Submissions", *Internet Article*, Retrieved from <http://web.archive.org/web/20050619014308/http://www.rss-specifications.com/rss-submission.htm> on Nov. 13, 2008,pp. 1-3.
"Search Engine Subscriptions", *Internet Article*, Retrieved from <http://web.archive.org/web/20051217013212/http://ranchero.com/netnewswire/helpBook/searchEngineSubs.html> on Nov. 13, 2008,1 page.
"SearchFeed.png", *Print Screen in article*, Retrieved from <http://web.archive.org/web/20050623095831/http://ranchero.com/images/nnw2/searchFeed.png> on Nov. 13, 2008,1 page.
"Searching.png", *Print Screen from article*, Retrieved from <http://web.archive.org/web/20050623095422/http://ranchero.com/images/nnw2/searching.png> on Nov. 13, 2008,1 page.

(56) References Cited

OTHER PUBLICATIONS

"smartList.png", *Print Screen from Internet Article*, Retrieved from <http://web.archive.org/web/20050623095628/http://ranchero.com/images/nnw2/smartList.png> on Nov. 13, 2008,1 page.

"Subscribing and Unsubscribing", *Internet Article*, Retrieved from <http://web.archive.org/web/20060915152527/http://ranchero.com/netnewswire/helpBook/subUnsub.html> on Nov. 13, 2008,pp. 1-2.

"Supplemental Notice of Allowance", U.S. Appl. No. 10/781,586, (Jul. 18, 2008),3 pages.

"Supplemental Notice of Allowance", U.S. Appl. No. 10/781,586, (Jun. 4, 2008),2 pages.

"Supplemental Notice of Allowance", U.S. Appl. No. 11/036,910, (Jan. 5, 2011),2 pages.

"Supplemental Notice of Allowance", U.S. Appl. No. 12/021,894, (Jan. 12, 2011),6 pages.

"Supplemental Notice of Allowance", U.S. Appl. No. 12/021,894, (Feb. 8, 2011),6 pages.

"Syncing", *Internet Article*, Retrieved from <http://web.archive.org/web/20051217023557/http://ranchero.com/netnewswire/helpBook/syncing.html> on Nov. 13, 2008,1 page.

"syncing.png", *Print Screen from article*, retrieved from <http://web.archive.org/web/20050623095327/http://ranchero.com/images/nnw2/syncing.png> on Nov. 13, 2008,2 pages.

"Syndic8.com—Documents1", *Internet Article*, Retrieved from <http://web.archive.org/web/20050513214756/http://www.syndic8.com/documents/howto/> on Nov. 13, 2008,pp. 1-3.

"Syndic8.com—Documents2", *Internet Article*, Retrieved from <http://web.archive.org/web/20050622035505/http://www.syndic8.com/documents/howto/> on Nov. 13, 2008,pp. 1-3.

"Syndic8.com—HowToUse", *Internet Article*, Retrieved from <http://web.archive.org/web/20050619233841/http://www.syndic8.com/howto.php> on Nov. 13, 2008,pp. 1-4.

"The Feed Thickens", Retrieved from: <http://blog.flickr.net/en/2004/07/14/the-feed-thickens/>, (Jul. 14, 2004),2 pages.

"Yahoo! Publisher's Guide to RSS : Submit your RSS Feed", *Internet Article*, Retrieved from <http://web.archive.org/web/20051216153612/http://uk.promotions.yahoo.com/publisher/submit.html> on Nov. 13, 2008,pp. 1-3.

"Yahoo! Search Services and Tools", *Internet Search Screen*, Retrieved from <http://web.archive.org/web/20051001065344/http://search.yahoo.com/mrss/submit> on Nov. 13, 2008,1 page.

Anonymous, "The Evolution of RSS", (Online); XP002546010; Internet; Retrieved from the Internet: URL:http://web.archive.org/web/20041011055544/http://www.webreference.com/authoring/languages/xml/rss/1/7.html *the whole document*,(Oct. 11, 2004),1 page.

Asche, Ruediger R., "Multithreading for Rookies", *Microsoft Developer Network Technology Group*, Retrieved Apr. 17, 2002 from http://msdn.microsoft.com/library/en-us/dndllpro/html/msdn_threads.asp?frame=true, (Sep. 24, 1993),13 pages.

Attardi, G et al., "The LOA Customizable Media Aggregator", *Automated Production of Cross Media Content for Multi-Channel Distribution, 2005. Axmedis 2005*. First International Conference on Florence, Italy 30-02 Nov. 2005, Piscataway, NJ, USA, *IEEE*, Nov. 30, 2005. XP010892440 ISBN: 978-0-7695-2348-4, (Nov. 30, 2005),pp. 1-8.

Ayers, Danny et al., "Beginning RSS and Atom Programming", Wiley Publishing, Inc.,(2005),pp. 1-54.

Baldwin, J F., et al., "A Mass Assignment Based ID3 Algorithm for Decision Tree Introduction", *International Journal of Intelligent Systems*, vol. 12, No. 7, (1997),pp. 523-548.

Benzinger, Brian "Google Reader Reviewed", Retrieved from: <http://www.solutionwatch.com/250/google-reader-reviewed> on Jun. 17, 2009, (Oct. 7, 2005),5 pages.

Blair, Eric "Review: NetNewsWire 2.0", Retrieved from: <http://www.atpm.com/11.06/netnewswire.shtml> on Nov. 11, 2008, (Jun. 2, 2005),12 pages.

Cloete, I et al., "CID3: An Extension of ID3 for Attributes with Ordered Domains", *South African Computer Journal*, vol. 4, (1991),pp. 10-16.

Gill, Kathy E., "Blogging, RSS and the Information Landscape: A Look at Online News", In *Proceedings of WWW 2005*, (2005),7 pages.

Hammersley, Ben "Content Syndication with RSS", Chapter 10: *Directories, Web Aggregators, and Desktop Readers*, O' Reilly books,(Mar. 2003),pp. 132-148.

Hammersley, Ben "Developing Feeds with RSS and Atom", *O'Reilly books*, O'Reilly Media, Inc.,(Apr. 2005),10 pages.

Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentialsarea.pdf>,(Jul. 18, 2004),26 pages.

Huier, Zhang et al., "Design and Implementation of RSS-based Science and Technology Information Syndication System", *Library of Chinese Academy of Sciences*, (2005),pp. 1-15.

Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn_virtmm.asp?frame=true, (Jan. 20, 1993),9 pages.

Mehta, Manish et al., "SLIQ: A Fast Scalable Classifier for Data Mining", available at <<http://www.dbis.informatik.hu-berlin.de/dbisold/lehre/WS0405/KDD/paper/MAR96.pdf >>, (Mar. 1996),15 Pages.

Sato, T. et al., "XFIG Version 3.2 Patchlevel 2 Users Manual Edition 1.0", Available at http://tinf2.vub.ac.be/~dvermeir/manuals/xfig/lib/X11/xfig/html/index.html, (Jul. 2, 1998),37 pages.

Sebastiani, F "A Tutorial on Automated Text Categorisation", In Analia Amandi and Ricardo Zunino, editors, *Proceedings of ASAI-99, 1st Argentinean Symposium on Artificial Intellligence*, Buenos Aires, AR, (1999),pp. 7-35.

Verisign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.

Zaki, Mohammed J., et al., "Parallel Classification for Data Mining on Shared-Memory Multiprocessors", *ACM*, (Mar. 1999),pp. 1-8.

"Foreign Office Action", Japanese Application No. 2002-503700, (May 10, 2011),5 pages.

"Foreign Office Action", Japanese Application No. 2002-503701, (May 31, 2011),10 pages.

"Foreign Office Action", Japanese Application No. 2006-071589, (Mar. 29, 2011),9 pages.

"Non Final Office Action", U.S. Appl. No. 12/126,532, (Mar. 24, 2011),23 pages.

"Non Final Office Action", U.S. Appl. No. 12/249,973, (Apr. 12, 2011),8 pages.

"Notice of Reexamination", Chinese Application No. 01813138.7, (Apr. 22, 2011),14 pages.

"Supplemental Notice of Allowance", U.S. Appl. No. 11/107,347, (Jun. 10, 2011),10 pages.

"Supplemental Notice of Allowance", U.S. Appl. No. 11/218,149, (Jun. 6, 2011),2 pages.

"Supplemental Notice of Allowance", U.S. Appl. No. 11/931,730, (Apr. 22, 2011),2 pages.

"Supplemental Notice of Allowance", U.S. Appl. No. 11/931,730, (May 6, 2011),2 pages.

Altova, "www.xmlspy.com Spy 4 You User and Reference Manual Version 4.4", available at <http://v44.sw.altova.com/SpyManual44.pdf>,(May 24, 2002),pp. 1-605.

Hall, Richard S., "Evaluating Software Deployment Languages and Schema", In Proceedings of International Conference on Software Maintenance,(Nov. 1998),9 pages.

Hall, Richard S., et al., "Specifying the Deployable Software Description Format in XML", *CU-SERL-207-99*, Software Engineering Research Laboratory, University of Colorado at Boulder,(Mar. 31, 1999),17 pages.

W3C, "XForms 1.0", retrieved from <file:///HI/NPL/W3C XForms1_0 - Working Draft 20010216.thm> on Apr. 5, 2011,(Feb. 16, 2001),4 pages.

"Final Office Action", U.S. Appl. No. 10/609,274, (Oct. 3, 2008),50 pages.

"Final Office Action", U.S. Appl. No. 10/609,274, (Oct. 31, 2007),41 pages.

(56) References Cited

OTHER PUBLICATIONS

"Final Office Action", U.S. Appl. No. 10/770,240, (Apr. 13, 2011), 17 pages.
"Final Office Action", U.S. Appl. No. 10/770,240, (Jun. 26, 2009), 15 pages.
"Final Office Action", U.S. Appl. No. 10/770,240, (Jun. 29, 2007), 28 pages.
"Final Office Action", U.S. Appl. No. 11/927,296, (Jul. 7, 2011), 12 pages.
"Foreign Office Action", European Patent Application No. 01935325.9, (Jun. 20, 2011), 5 pages.
"Non Final Office Action", U.S. Appl. No. 10/609,274, (Jan. 17, 2007), 43 pages.
"Non Final Office Action", U.S. Appl. No. 10/609,274, (Apr. 2, 2008), 43 pages.
"Non Final Office Action", U.S. Appl. No. 10/770,240, (Oct. 29, 2010), 14 pages.
"Non Final Office Action", U.S. Appl. No. 10/770,240, (May 13, 2010), 15 pages.
"Non Final Office Action", U.S. Appl. No. 10/770,240, (Aug. 24, 2006), 25 pages.
"Non-Final Office Action", U.S. Appl. No. 11/170,521, (Aug. 3, 2011), 16 pages.
"Notice of Allowance", U.S. Appl. No. 11/927,296, (Aug. 8, 2011), 7 pages.
Moats, R. "A URN Namespace for IETF Documents", *RFC 2648*, (Aug. 1999), pp. 1-30.
Moats, R. "URN Syntax", *RFC 2141*, (May 1997), pp. 1-8.
Sollins, et al., "Functional Requirements for Uniform Resource Names", *RFC 1737*, (Dec. 1994), pp. 1-7.
"Final Office Action", U.S. Appl. No. 10/857,689, (Jan. 15, 2008), 15 pages.
"Foreign Notice of Allowance", Application No. JP2006-060050, (Dec. 1, 2011), 6 pages.
"Foreign Notice of Allowance", Australian Application Number, (Sep. 23, 2010), 3 pages.
"Foreign Notice of Allowance", Canadian Application No. 2408527, (Apr. 17, 2012), 1 page.
"Foreign Office Action", Canadian Application No. 2,408,313, (Jun. 18, 2012), 7 pages.
"Foreign Office Action", Japanese Application No. 2002-503701, (Mar. 16, 2012), 3 pages.
"Non-Final Office Action", U.S. Appl. No. 10/857,689, (Dec. 17, 2009), 19 pages.
"Non-Final Office Action", U.S. Appl. No. 10/857,689, (Jun. 13, 2007), 23 pages.
"Non-Final Office Action", U.S. Appl. No. 10/857,689, (Jul. 18, 2008), 18 pages.
"Non-Final Office Action", U.S. Appl. No. 12/694,836, (Mar. 9, 2012), 30 pages.
"Notice of Allowance", U.S. Appl. No. 10/857,689, (May 14, 2010), 9 pages.
"Notice of Allowance", U.S. Appl. No. 11/170,521, (Jan. 19, 2012), 7 pages.
"Supplemental Notice of Allowance", U.S. Appl. No. 10/395,505, (Aug. 24, 2007), 2 pages.
Dubinko, et al., "XForms 1.0", *W3C Recommendation*, Retrieved from: <www.w3.org.TR/2003/REC-xforms-20031014/> on Feb. 29, 2012, (Oct. 14, 2003), 35 pages.
"Final Office Action", U.S. Appl. No. 10/976,451, (Nov. 17, 2008), 9 pages.
"Foreign Notice of Allowance", Canadian Application No. 2533147, (Mar. 11, 2013), 1 page.
"Foreign Office Action", Canadian Application No. 2533147, (Jan. 25, 2013), 2 pages.
"Non-Final Office Action", U.S. Appl. No. 10/976,451, (Aug. 20, 2008), 9 pages.
"Notice of Allowance", U.S. Appl. No. 10/976,451, (Feb. 4, 2013), 9 pages.

"Notice of Allowance", U.S. Appl. No. 12/028,651, (Jan. 3, 2013), 7 pages.
"Supplemental Notice of Allowance", U.S. Appl. No. 13/161,419, (Feb. 25, 2013), 2 pages.
"Supplemental Notice of Allowance", U.S. Appl. No. 13/161,419, (Mar. 25, 2013), 3 pages.
"Foreign Office Action", Taiwan Application No. 095103951, (11/8/2102), 15 pages.
"Intention to Grant", European Patent Application No. 01935325.9, (Dec. 7, 2012), 7 pages.
"Notice of Allowance", U.S. Appl. No. 13/161,419, (Dec. 7, 2012), 5 pages.
"Taiwan Search Report", Taiwan Application No. 095103951, (Nov. 8, 2012), 1 page.
"Final Office Action", U.S. Appl. No. 10/876,433, (Nov. 14, 2008), 31 pages.
"Final Office Action", U.S. Appl. No. 12/694,836, (Aug. 29, 2012), 27 pages.
"Foreign Office Action", Korean Application No. 10-2006-0003894, (Jun. 12, 2012), 4 pages.
"Foreign Office Action", Korean Application No. 10-2006-0012016, (Oct. 30, 2012), 6 pages.
"Foreign Office Action", Korean Application No. 10-2012-0054230, (Aug. 19, 2012), 9 pages.
"Foreign Office Action", Malaysian Application No. PI 20060743, (Jun. 8, 2012), 3 pages.
"Non Final Office Action", U.S. Appl. No. 10/876,433, (May 12, 2008), 26 pages.
"Non-Final Office Action", U.S. Appl. No. 10/976,451, (Jul. 23, 2012), 9 pages.
"Non-Final Office Action", U.S. Appl. No. 12/722,414, (Aug. 15, 2012), 27 pages.
"Non-Final Office Action", U.S. Appl. No. 13/161,419, (Aug. 15, 2012), 7 pages.
"Notice of Allowance", U.S. Appl. No. 10/876,433, (Nov. 10, 2009), 13 pages.
"Summons to Attend Oral Proceedings", European Patent Application No. 01935325.9, (Sep. 7, 2012), 9 pages.
"The History of Notes and Domino", *developerWorks Technical Resource Portal*, Retrieved from: <http://www.ibm.com/developerworks/lotus/library/ls-NDHistory/> on Jul. 9, 2010, (Nov. 14, 2007), 18 pages.
Brabrand, Claus et al., "PowerForms: Declarative Client-Side Form Field Validation", *BRICS*, Department of Computer Science, University of Aarhus, Denmark, World Wide Web, vol. 3, No. 4, (2000), pp. 205-214.
Chan, Chee-Yong et al., "Efficient Filtering of XML Documents with XPath Expressions", The VLDB Journal (2002) 11, (Jun. 1, 2002), pp. 354-379.
Schmalstieg, Dieter et al., "Using Transparent Props for Interaction with the Virtual Table", *Proceedings of the 1999 symposium on Interactive 3D graphics.*, available at <http://citeseerx.ist.psu.edu/viewdoc/summary?doi=10.1.1.35.8236>, (Apr. 26, 1999), 8 pages.
"Advisory Action", U.S. Appl. No. 10/632,297, (Dec. 29, 2006), 3 pages.
"Advisory Action", U.S. Appl. No. 10/723,188, (Feb. 21, 2007), 5 pages.
"Final Office Action", U.S. Appl. No. 09/599,813, (Feb. 8, 2005), 27 pages.
"Final Office Action", U.S. Appl. No. 09/599,813, (May 5, 2006), 46 pages.
"Final Office Action", U.S. Appl. No. 10/632,297, (Sep. 8, 2006), 31 pages.
"Final Office Action", U.S. Appl. No. 10/723,188, (Nov. 3, 2006), 33 pages.
"Final Office Action", U.S. Appl. No. 12/028,651, (Jul. 26, 2011), 9 pages.
"Foreign Notice of Allowance", JP Application No. 2002-503701, (Jul. 6, 2012), 6 pages.
"Foreign Office Action", CN Application No. 01813162.X, (Feb. 16, 2007), 4 pages.
"Foreign Office Action", CN Application No. 01813162.X, (May 9, 2008), 3 pages.

(56) References Cited

OTHER PUBLICATIONS

"Foreign Office Action", CN Application No. 01813162.X, (Oct. 12, 2007), 7 pages.
"Foreign Office Action", EP Application No. 01937375.2, (Sep. 5, 2006), 4 pages.
"Foreign Office Action", Japanese Application No. 2002-503701, (Aug. 10, 2010),11 pages.
"International Search Report", Application No. PCT/US01/15226, (Apr. 3, 2003), 4 pages.
"International Search Report", Application No. PCT/US01/15576, (Feb. 24, 2003), 2 pages.
"Non-Final Office Action", U.S. Appl. No. 09/599,813, (Jan. 24, 2006), 22 pages.
"Non-Final Office Action", U.S. Appl. No. 09/599,813, (Feb. 18, 2004), 23 pages.
"Non-Final Office Action", U.S. Appl. No. 09/599,813, (Aug. 10, 2005), 25 pages.
"Non-Final Office Action", U.S. Appl. No. 09/599,813, (Aug. 19, 2004),18 pages.
"Non-Final Office Action", U.S. Appl. No. 10/632,297, (Mar. 20, 2006), 23 pages.
"Non-Final Office Action", U.S. Appl. No. 10/632,297, (May 25, 2007), 22 pages.
"Non-Final Office Action", U.S. Appl. No. 10/723,188, (Apr. 16, 2008),16 pages.
"Non-Final Office Action", U.S. Appl. No. 10/723,188, (Jun. 14, 2006), 25 pages.
"Non-Final Office Action", U.S. Appl. No. 10/953,933, (Jul. 9, 2007), 26 pages.
"Non-Final Office Action", U.S. Appl. No. 11/056,439, (05/23/2070), 5 pages.
"Non-Final Office Action", U.S. Appl. No. 11/056,500, (Sep. 4, 2008), 7 pages.
"Notice of Allowance", U.S. Appl. No. 09/599,813, (Sep. 19, 2006), 9 pages.
"Notice of Allowance", U.S. Appl. No. 10/632,297, (Nov. 14, 2007), 7 pages.
"Notice of Allowance", U.S. Appl. No. 10/953,933, (Mar. 14, 2008), 8 pages.
"Notice of Allowance", U.S. Appl. No. 11/056,439, (Feb. 5, 2008), 8 pages.
"Notice of Allowance", U.S. Appl. No. 11/056,439, (Sep. 18, 2007),12 pages.
"Notice of Allowance", U.S. Appl. No. 11/103,836, (Oct. 18, 2007), 6 pages.
"Final Office Action", U.S. Appl. No. 10/988,720, (Oct. 14, 2008),17 pages.
"Final Office Action", U.S. Appl. No. 12/694,836, (Apr. 24, 2013), 36 pages.
"Final Office Action", U.S. Appl. No. 12/694,836, (Sep. 16, 2013), 35 pages.
"Foreign Office Action", Canadian Office Action 2,800,037, (Sep. 30, 2013), 2 Pages.
"Foreign Office Action", European Application No. 06101267.0, (Apr. 24, 2013), 7 pages.
"Non-Final Office Action", U.S. Appl. No. 10/770,240, (Sep. 13, 2013),15 pages.
"Non-Final Office Action", U.S. Appl. No. 10/990,152, (Jun. 16, 2008),14 pages.
"Non-Final Office Action", U.S. Appl. No. 13/051,741, (Apr. 24, 2013),11 pages.
"Non-Final Office Action", U.S. Appl. No. 13/159,239, (May 23, 2013), 34 pages.
"Non-Final Office Action", U.S. Appl. No. 13/915,364, (Sep. 17, 2013),19 pages.
"Supplemental Notice of Allowance", U.S. Appl. No. 10/976,451, (Apr. 22, 2013), 2 pages.
"Supplemental Notice of Allowance", U.S. Appl. No. 10/976,451, (May 22, 2013), 2 pages.
"Supplemental Notice of Allowance", U.S. Appl. No. 10/976,451, (Jun. 18, 2013), 2 pages.
"Final Office Action", U.S. Appl. No. 13/159,239, (Dec. 11, 2013), 38 pages.
"Foreign Notice of Allowance", TW Application No. 95103951, (Nov. 6, 2013), 4 pages.
"Non-Final Office Action", U.S. Appl. No. 10/770,240, (Sep. 3, 2013),15 Pages.
"Non-Final Office Action", U.S. Appl. No. 12/126,532, (Sep. 27, 2013),19 Pages.
"Non-Final Office Action", U.S. Appl. No. 12/722,414, (May 21, 2013), 20 pages.
"Final Office Action", U.S. Appl. No. 12/722,414, Dec. 4, 2013, 23 Pages.
"Final Office Action", U.S. Appl. No. 13/051,741, Feb. 6, 2014, 11 pages.
"Final Office Action", U.S. Appl. No. 13/915,364, Jan. 28, 2014, 21 pages.
"Foreign Office Action", CA Application No. 2,408,313, Jun. 18, 2012, 7 Pages.
"Notice of Acceptance", AU Application No. 2006200483, Dec. 17, 2010, 3 pages.
"Notice of Allowance", U.S. Appl. No. 10/770,240, Jan. 3, 2014, 10 Pages.
"Notice of Allowance", U.S. Appl. No. 12/028,651, Feb. 20, 2014, 8 Pages.
"AppleWorks", Retrieved from: <http://en.wikipedia.org/wiki/AppleWorks> on Jul. 4, 2014, Jul. 3, 2014, 6 pages.
"European Search Report", EP Application No. 12152133.0, Jul. 14, 2014, 10 pages.
"Foreign Office Action", BR Application No. PI0111797-1, May 5, 2014, 4 Pages.
"Foreign Office Action", EP Application No. 01939368.5, Jul. 16, 2014, 9 Pages.
"Non Final Office Action", U.S. Appl. No. 12/126,532, Jul. 2, 2014, 19 Pages.
"Non-Final Office Action", U.S. Appl. No. 13/207,125, Jun. 6, 2014, 17 Pages.
Simpson, "WordPerfect 6 for Windows Instant Reference", SYBEX, Alameda, CA, US, ISBN: 978-0-78-211383-9, Jan. 1994, 14 pages.
StylusStudio, "StylusStudio: XPath Tools", 2004-2007, StylusStudio,1-14.
Hall, Ricard S., "Agent-based Software Configuration and Development", Retrieved from http://www.cs.colorado.edu/users/rickhall/documents/ThesisFinal.pdf on Nov. 7, 2003, Thesis of the University of Colorado,(Dec. 31, 1999),169 pages.
Altova, et al., "XML Spy, XML Intergrated Development Environments", Altova Inc.,(2002),pp. 1-18.
Dayton, Linnea et al., "Photo Shop 5/5.5 WOW! Book,", 2000, Peachpit Press,pp. 8-17.
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
Bradley, Neil "The XML Companion, Third Edition", Published by Addison Wesley Professional, http://proquest.safaribooksonline.com0201770598, http,(Dec. 12, 2001),1-18.
Klarlund, Nils "DSD: A Schema Language for XML", *ACM, FSMP* Portland Oregon, (2000),101-111.
Watt, Andrew "Microsoft Office Infopath 2003 Kick Start", (Published by Sams) Print ISBN-10:0-672-32623-X, (Mar. 24, 2004),1-57.
Hu, et al., "A Programmable Editor for Developing Structured Documents based on Bidirectional Transformations", ACM,(Aug. 2004),178-179.
Kay, Michael "XSL Transfornmations (XSLT) Version 2.0", http://www.w3.org/TR/2005/WD-xslt20-20050404, (04/205),1-374.
Han, Richard et al., "Websplitter: A Unified XML Framework for Multi-Device Collaborative Web Browsing", *IBM Thomas J. Watson Research Center*, (2000),1-10.
Borland, Russo "Running Microsoft Word 97", 314-315, 338, 361-362, 390, and 714-719.
"Microsoft Word 2000", Screenshots,(1999),1-5.

(56) References Cited

OTHER PUBLICATIONS

"Excel Developer Tip, Determining the Data Type of a Cell", (available at http://jwalk.com/ss/excel/tips/tip62.htm)., (May 13, 1998),1 page.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 by Example", Retrieved from the Internet at http://www.perfectxml.com/InfoPath.asp on Jan. 21, 2007,(Apr. 20, 2003).
Raman, T. V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006, 1 page.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).
"Microsoft Visual Basic 5.0 Programmer's Guide", *Microsoft Press*, (1997), pp. 42-43, 54-58.
Nelson, Joe "Client-side Form Validation Using JavaScript", *Developer Advisory*, (Sep. 21, 2001).
Barabrand, et al., "Power Forms Declarative Client-side Form Field Validation", (2002),1-20.
Anat, Eyal et al., "Integrating and Customizing Hererogeneous E-Commerce Applications", The VLDB Journal—The International Journal on Very Large Data Bases, vol. 10, Issue 1,(Aug. 2001),16-38.
Adams, Susie et al., "BizTalk Unleashed", Sams publishing, 2002, first printing Mar. 2001,1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
"Microsoft Word 2000 Screenshots", (2000),11-17.
XmlSpy, "XmlSpy 2004 Enterprise Edition Manual", Altova,(May 17, 2004),1-25, 220-225.
Dodds, "Toward an XPath API", xml.com,(May 7, 2001),1-3.
Altova, "Altova Tools for XPath 1.0/2.0", Retrieved from http://www.altova.comdev_portal_xpath.html, Altova,(2007),1-12.
"Microsoft Word 2000 Screenshots", Word,(2000),1-17.
Pacheco, Xavier et al., "Delphi 5 Developer's Guide", Sams Publishing. Chapter 31, Section: Data Streaming,(1999),4.
Dyck, Timothy "XML Spy Tops as XML Editor", eWeek, vol. 19, No. 47, Nov. 2002,,p. 48.

Hardy, Matthew R., et al., "Mapping and Displaying Structural Transformations between XML and PDF", Proceedings of the 2002 ACM Symposium on Document Engineering 2002, ACM Press,pp. 95-102.
"XML Forms Architecture (XFA)", Retrieved from http://xml.coverpages.org/xfa.html on Aug. 17, 2006, Cover Pages Technology Reports,,(Jun. 16, 2000),4 pages.
Dubinko, et al., "XForms 1.0, W3C Working Draft", W3C,(Dec. 7, 2001),pp. 1-125.
Ducharme, "InfoPath and XForms", Retrieved from http://www.weblog.infoworld.com/udell2003/02/26.html, InfoWorld,(Feb. 26, 2003),pp. 1-3.
"Microsoft Computer Dictionary", Microsoft Press, 5th Edition,p. 149.
Raggett, "HTML Tables", Retrieved from http:www.//is-edu.homuns.edu.vn/WebLib/books/Web/Tel/html3-tables.html on Aug. 6, 2006, W3C Internet Draft,,(Jul. 7, 1995),pp. 1-12.
"OLE Open Doc and Network", Retrieved from http://www.pcwebopedia.com on May 9, 2006, Webopedia entries,7 pages.
"Streamlining Content Creation", Ixia Soft Jun. 6, 2002,pp. 1-16.
Van Hoff, Arthur et al., "The Open Software Description Format", Retrieved from www.w3.org/TR/NOTE-OSD on Nov. 7, 2003, (Aug. 13, 1997),11 pages.
"SmartUpdate Developer's Guide", Retrieved from http://developer.netscapte.com:80/docs/manuals/communicator/jarman/index.htm on Dec. 8, 2000, Netscape Communications Corp,(Mar. 11, 1999),83 pages.
Hwang, Kai et al., "Micro-Firewalls for Dynamic Network Security with Ditributed Intrusion Detection", IEEE Int'l, Symposium on Network Computing and Applications, 2001,pp. 68-79.
Schmid, M et al., "Protecting Data from Malicious Software", 18th Annual Security Applications Conference,(2002),pp. 199-208.
Kaiya, Haruniko et al., "Specifying Runtime Environments and Functionalities of Downloadable Components under the Sandbox Model", Int'l Symposium on Principles of Software Evolution, 2000,,(2000),pp. 138-142.
Tomimori, Hiroyuki et al., "An Efficient and Flexible Access Control Framework for Java Programs in Mobile Terminals", Proceeding of 22nd Int'l Conference on Distrubuted Computing Systems Workshops,(2002),pp. 777-782.
Rapaport, L "Get More From SharePoint", Transform Magazine, vol. 11, No. 3,,(Mar. 2002),pp. 13-15.
"Whitehill Composer Software product", Retrieved from www.xml.com/pub/p/221 on Apr. 8, 2004, Whitehill Technologies, Inc.,2 pages.
McCright, J.S. "New Tool kit to Link Groove with Microsoft SharePoint", eWeek, Enterprise News & Reviews, Ziff Davis Media Inc.,(Jul. 29, 2002),1 page.
"The Search Form to Custom Pages in Windows SharePoint Services-based Web Sites", Retrieved from www.sharepointcustomization.com/resources/tipstricks/04wss-searchbox-tip.htm, Microsoft Corp,(2004),2 pages.
"Dreamweaver Technote: Changes in copying and pasting in Dreamweaver 4", http://store1.adobe.com/cfusion/knowledgebase/index.cfm?id=tn_15152, (Mar. 2001),2 pages.
"How to create a template that makes it easy for users to 'fill in the blank' withough doing any programming,", Retrieved from http://word.mvps.org/FAQs/Customization/FillinTheBlanks.htm, (Apr. 2004),2 pages.
Acklen, et al., "Using Corel Wordperfect 9", Que Corporation,,(1998),pp. 251-284, 424-434, 583-585.
Halberg, et al., "Using Microsoft Excel 97", Que Corporation,,(1997),pp. 1-9, 18-25, 85-89, 98-101, 106-113, 124-127, 144-147, 190-201, 209-210, 218-227, 581-590, 632-633, 650-655, 712-714.
"Stack Algorithm for Extracting Subtree from Serialized Tree", IBM Technical Disclosure Bulletin, TDB-ACC-No. NN94033,3 pages.
Leblond, et al., "PC Magazine Guid to Quattro Pro for Windows", Ziff-Davis Press,(1993),pp. 9-11, 42-61.
Mansfield, "Excel 97 for Busy People", Osborne/Mcgraw-Hill,,(1997),pp. 48-50.
"Resizing Controls Dynamically", Microsoft Visual Basic 5.0 Programmer's Guide 1997,pp. 578-579.

(56) References Cited

OTHER PUBLICATIONS

"About Microsoft Word", Microsoft Word 2000, published 1983-1999, and Microsoft Excel 2000 (see Screen Shot "About Microsoft Excel") Published 1988-1999,3 pages.
Pike, et al., "Plan 9 From Bell Labs", AT&T Bell Laboratories, UKUUG, Summer 1990,10 pages.
Berg, A "Naming and Binding: Moniders,", Inside OLE, Chapter 9, Harmony Books,(1995),pp. 431-490.
Herzner, et al., "CDAM—Compound Document Access and Management. An Object-Oriented Approach", MultiMedia Systems Interaction and Applications, Chapter 3,,(1992),pp. 17-36.
Staneck, W "Internal and External Media", Electronic Publishing Unleashed, Chapter 22,,(1995),pp. 510-542.
Kobayashi, et al., "An update on BTRON-specification OS Development", 0-8186-2475-2/91, IEEE 1991,pp. 132-140.
Peterson, B "Unix Variants", Unix Review, vol. 10, No. 4,,(Apr. 1992),pp. 29-31.
"Store and Organize Related Project Files in a Binder", Getting results with Microsoft Office,(1990),pp. 109-112.
Clapp, D "The NeXT Application Kit Part 1: Non-Responsive Classes,", The NeXT Bibile Chapter 16,,(1990),pp. 275-293.
Diclascia, et al., "Sweeper", Microsoft interactive developer, vol. 1., No. 1,(1996),27 pages.
Barker, et al., "Creating In-Line Objects Within an Intergrated Editing Environment", IBM Technical Disclosure Bulletin, vol. 27, No. 5,(Oct. 1984),p. 2962.
Pike, et al., "The Use of Name Spaces in Plan 9", Operating Systems Review, vol. 27, No. 2,(Apr. 1993),pp. 72-76.
Trupin, J "The Visual Programmer", Microsoft Systems Journal,(Apr. 1996),pp. 103-105.
Zdonik, S "Object Management System Concepts", ACM,(1984),pp. 13-19.
"OMG XML Metadata Interchange (XMI) Specification", Version 1.2,,(Jan. 2002).
Clark, J "XSL Transformation (XSLT), Version 1.0", Retrieved from www.w3.org/TR/1999/REC-xslt19991116, WC3,(Nov. 16, 1999),pp. 1-156.
Musgrave, S "Networking Technology—Impact and Opportunities", Survey and Statistical Computing 1996, Proceedings of the Second ASC International Conference, London, UK,,(Sep. 1996),pp. 369-378.
Clark, J. et al., "XML Path Language (XPath)", Retrieved from www.w3.org/TR/1999/RCE-xpath-19991116, Version 1.0,(Nov. 16, 1999),pp. 1-49.
Shu-Yoa Chien, et al., "Storing and Querying Multiversion XML Documents using Durable Node Numbers", IEEE,(2002),pp. 232-241.
Clark, P "From Small Beginnings", Knowledge Management,(Nov. 2001),pp. 28-30.
Prevelakis, Vassilis et al., "Sandboxing Applications", FREENIX Track: 2001 USENIX Annual Technical Conference,,pp. 119-126.
Sun, Q et al., "A Robust and Secure Media Signature Scheme for JPEG Images", Proceeding of 2002 IEEE Workshop on Multimedia Signal Processing,(Dec. 2002),pp. 296-299.
Komatsu, N et al., "A Proposal on Digital Watermark in Document Image Communication and it's Applications to Realizing a Signature", Electronics and Communication in Japan, Part I: Communications, vol. 73, No. 5,(May 1990),pp. 22-33.
Noore, A "A Secure Conditional Access System using Digital Signature and Encryption", International Conference on Consumer Electronics,(Jun. 2003),pp. 220-221.
Shu-Yoa Chien, et al., "XML Document Versioning", SIGMOD Record, vol. 30, No. 3,,(Sep. 2001),pp. 46-53.
Shu-Yoa Chien, et al., "Efficient schemes for managing multiversion XML documents", VLDB Journal,(2002),pp. 332-353.
Shu-Yao Chien, et al., "Efficient Management of Multiversion Documents by Object Referencing", Proceedings of the 27th VLDB Conference,(2001),pp. 291-300.

Au, Irene et al., "Netscape Communicator's Collapsible Toolbars", CHI 98, Human Factors in Computing Systems, Conference Proceedings, LA, CA,(Apr. 18-23, 1998),pp. 81-86.
Raymond, K W., et al., "Manageing and Querying Multi-Version XML Data with Update Logging", DocEng '02 Copyright 2002, ACM 1-58113-597-07/02/0011,(Nov. 8-9, 2002),pp. 74-81.
Usdin, Tommie et al., "XML: Not a Silver Bullet, But a Great Pipe Wrench", Standard View vol. 6, No. 3,(Sep. 1998),pp. 125-132.
Sutanthavibul, Supoj et al., "XFIG version 3.2 Patchlevel 2 (Jul. 2, 1998) Users Manual (Edition 1.0)", Retrieved from www.ice.mtu.edu/online_docs/sfig332/ on Jan. 28, 2003, Internet Document XP002229137,(Feb. 7, 1998).
"Netscape Communicator 4.61 for OS/2 Warp", Netscape Communication Corporation, Software 1999, The Whole software release & Netscape—Version 4.61 {en}-010615, Netscape Screenshot,,(Oct. 2, 2002).
"Architecture for a Dynamic Information Area Control", IBM Technical Disclosure Bulletin, IBM Corp, NY, US vol. 37, No. 10, Jan. 10, 1994,,(Jan. 10, 1994),pp. 245-246.
Alschuler, Liora "A tour of XMetal", Retrieved from www.sml.com/pub/a/SeyboldReport/ip031102.html on Feb. 5, 2003, XML.com, Online! XPOO2230081,(Jul. 14, 1999).
Davidow, Ari "XML Editors: Allegations of Functionality in search of Reality", Retrieved from www.ivritype.com/xml/, SP002230082,(1999).
Battle, Steven A., et al., "Flexible Information Presentation with XML", The Institution of Electrical Engineers,(1998),6 pages.
Cinacarini, Paolo A., et al., "Managing Complex Documents Over the WWW: A Case Study for XML", Transactions on Knowledge and Data Engineering, vol. 11, No. 4,(Jul./Aug. 1999),pp. 629-638.
Kanemoto, Hirotaka et al., "An Efficiently Updatable Index Scheme for Structured Documents", (1998),pp. 991-996.
Chuang, Tyng-Ruey "Generic Validation of Structural Content with Parametric Modules", ICFP, 01 copyright 2001, ACM 1-58113-415-0/01/0009,(Sep. 3-5, 2001),pp. 98-109.
Chen, YA Bing et al., "Designing Valid XML Views", ER 2002, LNCS 2503, Springer-Verlag Berlin Heidelberg 2002,pp. 463-477.
Chen, Yi et al., "XK Validator. A Constraint Validator for XML", CIKM 02, ACM1-58113-492-04-02-011,(Nov. 4-9, 2002),pp. 446-452.
Brogden, William "Arbortext Adept 8 Editor Review", Retrieved from www.xml.com/pub/a/1999/09/adept/AdeptRvw.htm on Feb. 5, 2003, O'Reilly xml.com, Online!,(Sep. 22, 1999).
Williams, Sara et al., "The Component Object Model: A Technical Overview", Microsoft Corp,(Oct. 1994),pp. 1-14.
Varlamis, Iraklis et al., "Bridging XML—Schema and relational database. A System for generating and manipulating relational databases using valid XML documents", DocEng 01, ACM 1-58113-432-0/01/0011,(Nov. 9-10, 2001),pp. 105-114.
Haukeland, Jan-Henrick "Tsbiff-tildeslash biff—version 1.2.1", http://web.archive.org/web/19990912001527/http://www.tildeslash.com/tsbiff/., (Jun. 1999).
Kim, Sang-Kyun et al., "Immediate and Partial Validation Mechanism for hte Conflict Resolution of Update Operations in XML Databases", WAIM 2002, LNCS 2419, 2002, Springer-Verlag Berlin Heidelberg,(2002),pp. 387-396.
U.S. Appl. No. 60/209,713, Kutay et al., filed Jun. 5, 2000.
U.S. Appl. No. 60/203,081, filed May 9, 2000.
U.S. Appl. No. 60/191,662, filed Mar. 23, 2000.
"Foreign Notice of Allowance", CA Application No. 2,800,037, Aug. 25, 2014, 1 Page.
"Foreign Office Action", EP Application No. 01935324.2, Sep. 10, 2014, 6 pages.
"Notice of Allowance", U.S. Appl. No. 12/028,651, Jul. 24, 2014, 7 Pages.
"Final Office Action", U.S. Appl. No. 13/159,239, Oct. 23, 2014, 42 pages.
Gajic, "Understanding ViewState and Postback Processing in ASP. Net applications", Retrieved from <http://web.archive.org/web/20050918075312/http://delphi.about.com/library/weekly/aa051705a.htm> on Oct. 23, 2014, Sep. 18, 2005, 3 pages.

\* cited by examiner

DESIGNING ELECTRONIC FORMS

RELATED APPLICATION

This application is a divisional of and claims priority to U.S. patent application Ser. No. 10/395,506 filed on Mar. 24, 2003 the disclosure of which is incorporated by reference herein.

BACKGROUND

Extensible markup language (XML) is increasingly becoming the preferred format for transferring data. XML is a tag-based hierarchical language that is extremely rich in terms of the information that it can be used to represent. For example, XML can be used to represent information spanning the spectrum from semi-structured information (such as one would find in a word processing document) to generally structured information (such as that which is contained in a table). XML is well-suited for many types of communication including business-to-business and client-to-server communication. For more information on XML, XSLT, and XSD (schemas), the reader is referred to the following documents which are the work of, and available from the W3C (World Wide Web consortium): XML Schema Part 2: Datatypes; XML Schema Part 1: Structures, and XSL Transformations (XSLT) Version 1.0; and XML 1.0 second edition specification.

With so much information being described and transferred through XML, it is increasingly important to have ways to view that information. One way to view information in an XML document is to transform it with an XSLT file into an HTML (or XHTML) document. HTML documents can be used to render, or view, information, such as information from an XML file. Using XSLT, rather than other transforming languages, is often preferred because XSLT is a W3C standard.

One purpose for using an XSLT file to transform an XML document is to create electronic forms. Electronic forms can be used not only to view information within an XML document, but also to allow a user of the electronic form to add, remove, or change information within the XML document by editing data in a data-entry field within the electronic form.

Currently, to create an HTML document (e.g., an electronic form) that renders information within an XML document, a programmer writes an XSLT file to transform the XML document into the HTML document. The programmer, however, must have a high degree of skill in programming XSLT to program an XSLT file, especially to create an electronic form.

Also, even with a high degree of programming skill, programming an XSLT file can be very time consuming and difficult. It can be difficult and time-consuming because an XSLT programmer cannot see the HTML document that he is creating as he is creating it. The programmer, rather, must complete an XSLT file and apply it to an XML file before he can see the view created with the resulting HTML document. Even with the view, each mistake made by the programmer, such as the style, layout, and structure of the view, can be very difficult to relate back to the mistake made in the XSLT file, further complicating programming of XSLT files to create HTML documents.

For these reasons, creating electronic forms and other HTML documents by transforming an XML document with an XSLT file is difficult, time consuming, and requires a high degree of skill.

SUMMARY

A system and method enabling a designer to build electronic forms from hierarchical data is described. Displays of hierarchical data, facilitation of selection of a portion of the hierarchical data, and displays of one or more transformation-language components associated with a selected portion of hierarchical data are described. Generation of an electronic form from transformation-language components selected by a designer is also described.

Also, a system capable of and/or a method of coupling a markup-language document and markup-language schema into a generalized instance is described. Receiving a markup-language document or markup-language schema or both and inferring a markup-language document from only a markup-language schema or a markup-language schema from only a markup-language document is described. With a markup-language document and markup-language schema, whether received or inferred, coupling of the markup-language document and the markup-language schema into a generalized instance is described.

BRIEF DESCRIPTION OF THE DRAWINGS

The same numbers are used throughout the disclosure and figures to reference like components and features.

DETAILED DESCRIPTION

The following disclosure describes a user-friendly way to design electronic forms using a visual representation of hierarchical data and a form-designing area of a display. Hierarchical data is presented in an area of a display screen, usually presented graphically, such as with an arrangement of icons. Icons represent some part of the hierarchical data and are generally a simplification of the data so that a designer can more easily understand the purpose of and choose from various parts of the hierarchical data. A designer can choose a part or portion of the hierarchical data that he or she wishes to include in an electronic form.

When the designer chooses part of the hierarchical data, such as by clicking on an icon representing part of the hierarchical data, a component representing a way to present that part of the hierarchical data can be placed on a form-designing area. The form-designing area is presented in an area of a display screen, usually appearing as a blank page, such as is often done when viewing a new document in a word-processing application. Components placed in a form-designing area can be manipulated by a designer to allow the designer to make an electronic form look and feel like the designer desires.

For discussion purposes, the visual representation of the data and the form-designing area are described in the context of a single computer, a set of user-input devices, and a single display screen having an area for displaying a representation of the data and another area for displaying the form-designing area. The display screen, computer, and user-input devices will be described first, followed by a discussion of the techniques in which these and other devices can be used.

The Display Screen, Computer, and User-Input Devices

Figure 1:
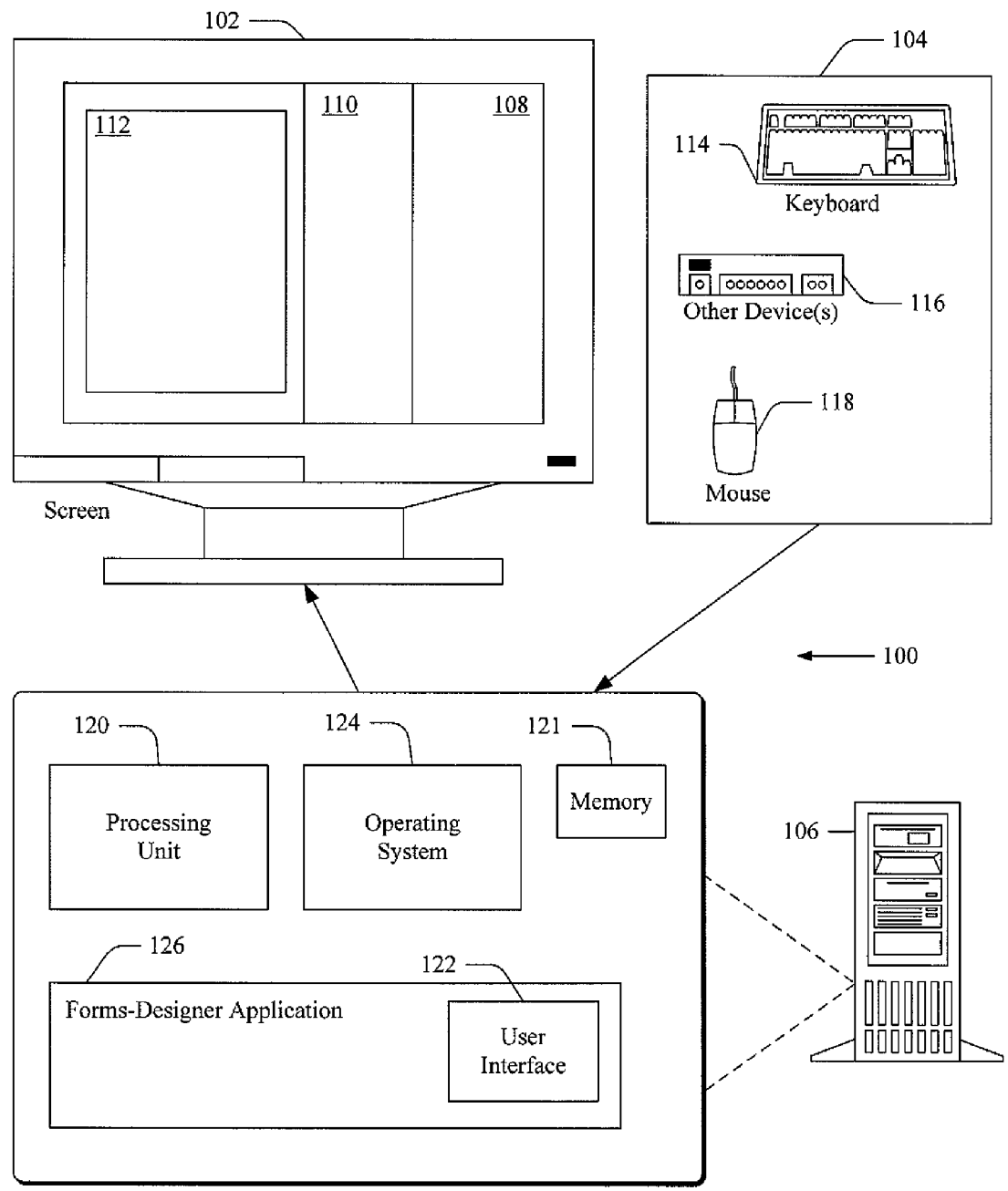
FIG. 1 illustrates a system with a display screen, computer, and user-input devices. The system implements a method for designing electronic forms.

FIG. 1 shows an exemplary system 100 that facilitates creation of electronic forms from a representation of data. The system 100 includes a monitor or screen 102, one or more user-input devices 104, and a computer 106. The user-input devices 104 can include any device allowing a computer to receive a designer's preferences, such as a keyboard 114, other device(s) 116 (e.g., a touch screen, a voice-activated input device, a track ball, etc.), and a mouse 118. The computer 106 includes a processing unit 120 and memory 121, which includes both volatile and non-volatile memory.

An operating system 124 and one or more applications are stored in memory and execute on the processing unit 120. One particular application is a forms-designer application 126, which allows a designer to create electronic forms with little or no programming skill. The forms-designer application 126 provides a visual what-you-see-is-what-you-get (WYSIWYG) user interface 122 that enables designers to visually construct an electronic form by visually selecting structured data items and arranging them into a form in a manner that is intuitive and straight forward. As the designer builds the form through the user interface, the application 126 enforces the underlying schemas to ensure that the form complies with the intended structure.

The user interface 122 includes three areas depicted on the screen 102: a data display area 108, a component display area 110, and a form-design area 112. The three areas may be shown individually, or in groups of two areas, as desired. The areas 108, 110, and 112 may be implemented as individual graphical windows, such as those supported by Microsoft's Windows® operating system. Alternatively, the areas may be panes within a common window, or some other graphical arrangement.

Data display area 108 shows a representation of a data source of hierarchical data. The data may be presented and structured in a number of ways. In one example, the data display area 108 depicts hierarchical data arranged into a tree structure having multiple nodes. From this data display area 108, a designer can select various parts of the hierarchical data to be represented in the form-design area 112 when constructing an electronic form. When the designer selects a certain portion of data in data display area 108, the forms-designer application 126 presents a list of components in the component display area 110 that can be used in the form-design area 112 to represent the selected portion of hierarchical data. The number and type of components in the component display area 110 varies depending upon the hierarchical data that is selected.

The designer can then choose one or more of the components in the component display area 110 and arrange them in a representation of a form being constructed in the form-design area 112. For instance, the designer can drag and drop a component from the component display area 110 (which corresponds to a selected portion of hierarchical data (e.g., a node in the data tree) from the display area 108) onto the form-design area 112, and the underlying forms-designer application 126 will show how the selected component will affect the electronic form produced.

Figure 2:
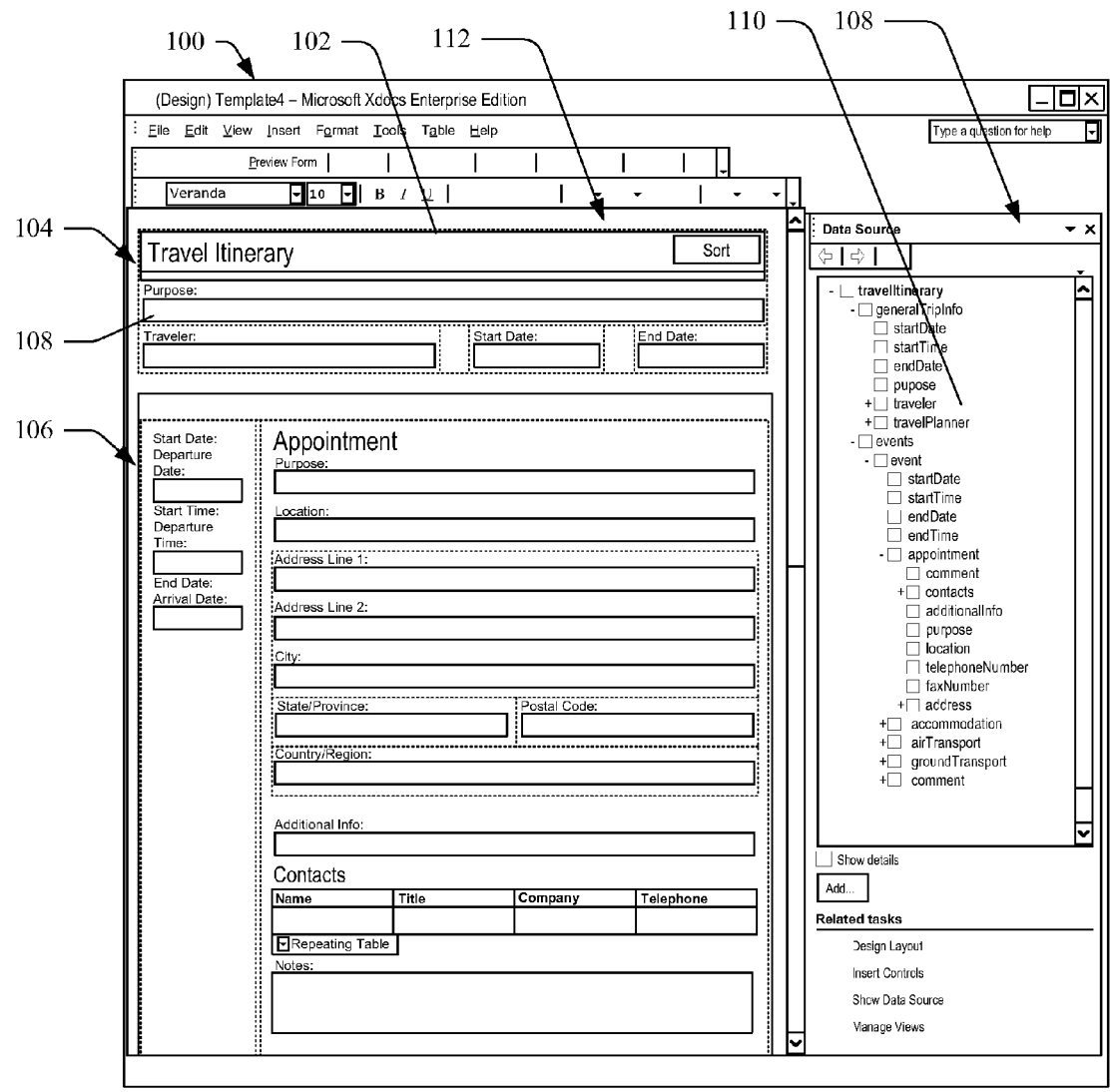
FIG. 2 illustrates an exemplary screen display showing a data display area and a substantially filled-in form-design area.

FIG. 2 shows an example screen display 200 illustrating construction of an electronic form in the form-design area 112 by selection of hierarchical data elements in the data display area 108. In this example, a representation 202 mimics an electronic form being constructed for a fictitious travel itinerary. It has a top section 204 that describes general trip information, having components that represent data-entry fields in the electronic form, which will allow entry of the purpose of the trip, the traveler's name, and the start and end dates. The representation 202 also has a bottom section 206 for tracking individual appointments made on the trip. In this example, the appointment section 206 will allow such entries as purpose of the appointment, its location, and the people contacted during the appointment.

The representation 202 follows the file of hierarchical data provided in data display area 108. In this example, the hierarchical data file is arranged into a tree structure, which includes a node named "generalTripInfo" that generally corresponds to the top portion 204 of the form, and hierarchical nodes named "event" and "appointment" that generally correspond to the bottom portion 206.

The representation 202 (and, eventually, the electronic form it mimics) can be constructed by selecting nodes in the data tree structure in display area 108 and arranging representative components onto the form-design area 112. For example, to create the "Purpose" entry field representation 208 in the top section 204, the designer selects the purpose node 210 in the data display area 108. The application presents a list of components (not shown in FIG. 2) corresponding to the purpose node 210. The designer then chooses a component and identifies a corresponding location in the form-design area 112 for the component to be placed. One technique for this selection and placement of the component is to drag-and-drop the selected component corresponding to the node 210 onto the desired location, and the forms-designer application 126 will show a representation of how an operable field corresponding to the component will appear in the electronic form.

The process used to build an electronic form from components associated with hierarchical data will be set forth in greater detail below. The above devices and applications are merely representative, and other known devices and applications may be substituted for or added to those shown in FIG. 1. One example of another known device that can be substituted for those shown in FIG. 1 is the device shown in FIG. 11.

Overview of Technique for Creating Electronic Forms

Figure 3:
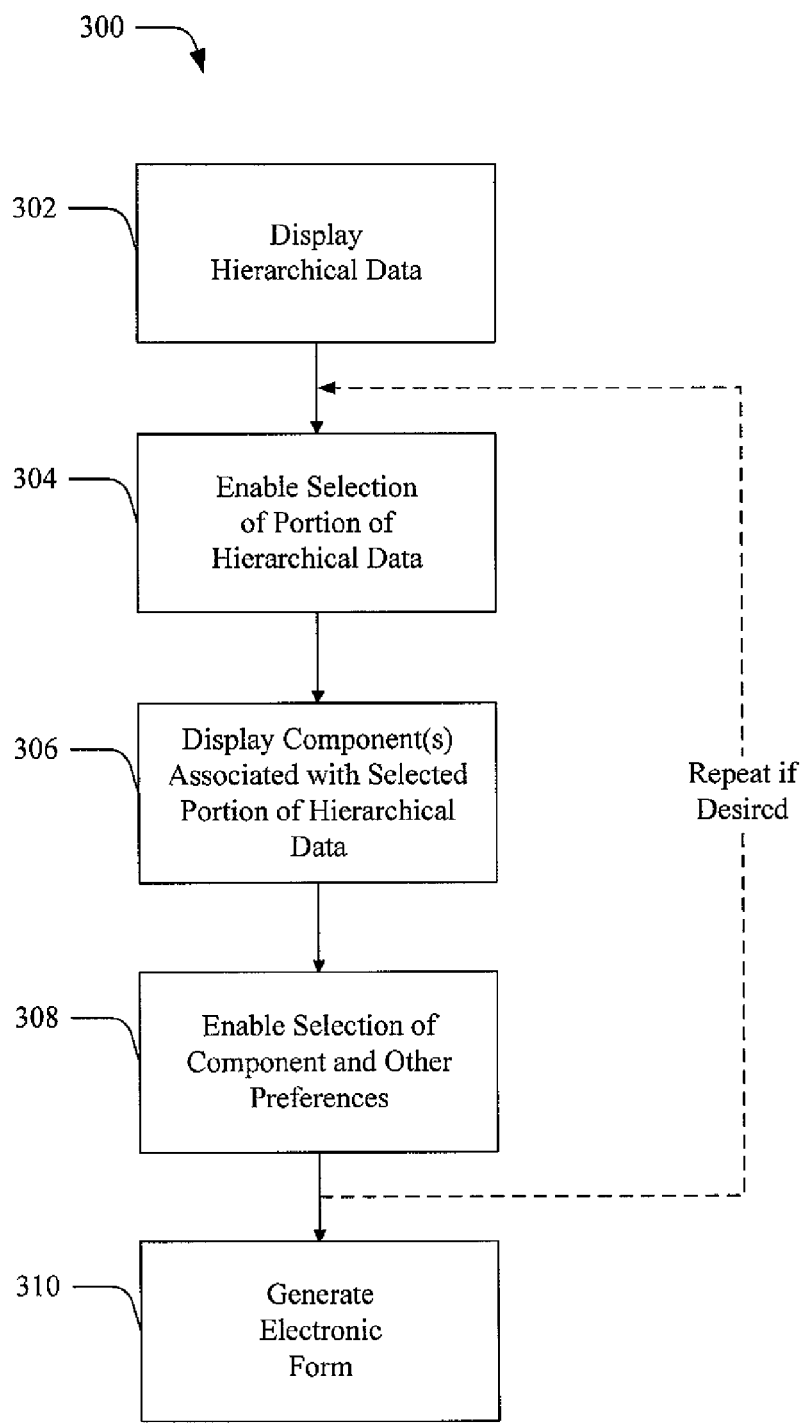
FIG. 3 is a flow diagram of an exemplary process for generating electronic forms.

FIG. 3 shows a process 300 for modularly generating an electronic form. The process 300 is illustrated as a series of blocks representing individual operations or acts performed by the system 100. The process 300 may be implemented in any suitable hardware, software, firmware, or combination thereof. In the case of software and firmware, the process 300 represents a set of operations implemented as computer-executable instructions stored in memory and executable by one or more processors.

Displaying Hierarchical Data

At block 302, the system 100 displays hierarchical data. The hierarchical data is displayed so that a designer can chose particular parts of the hierarchical data to be represented in an electronic form that the designer wants to build. The system 100 displays the hierarchical data so that it is easy for the designer to choose a particular part of the hierarchical data, such as by clicking on an icon.

Figure 4:
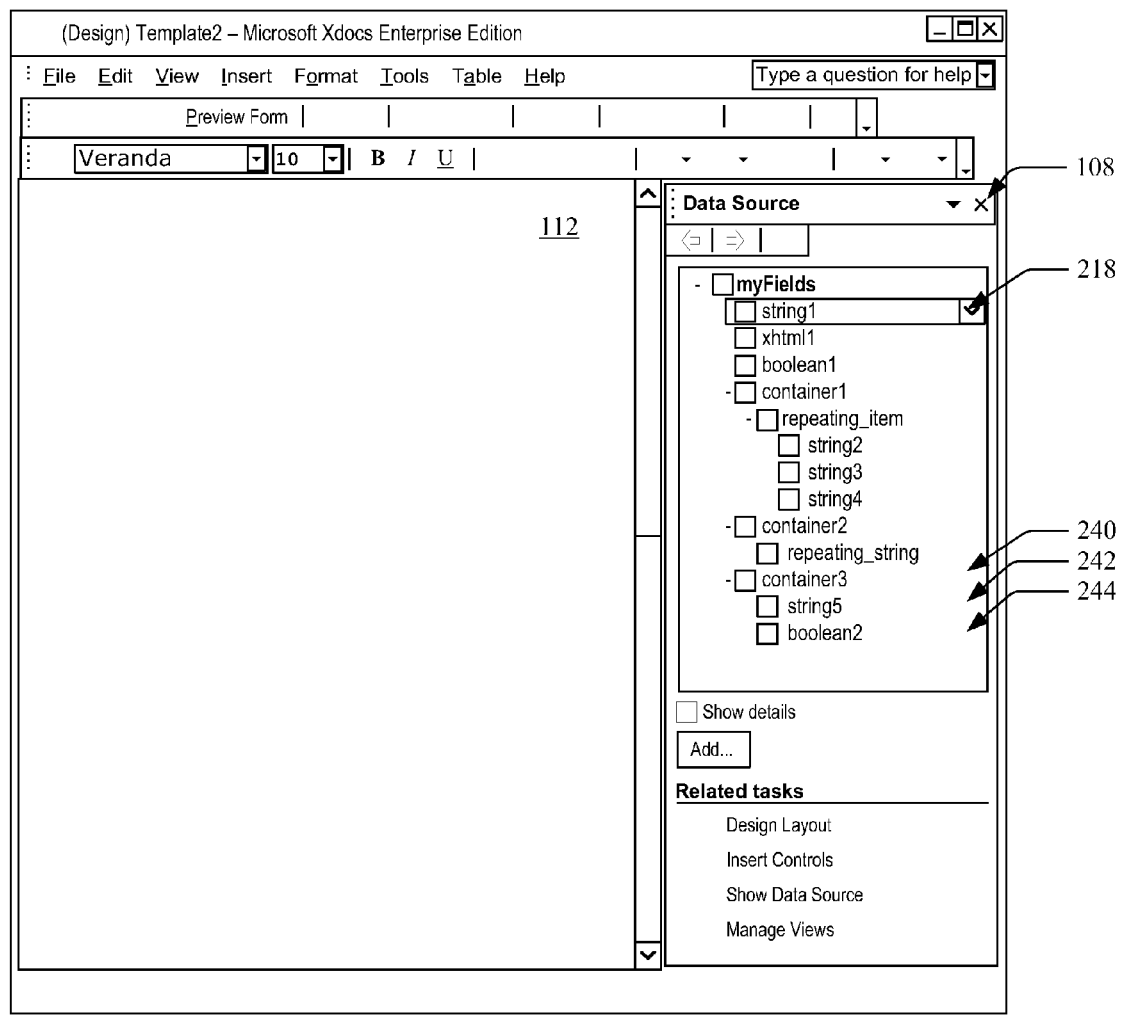
FIG. 4 illustrates an exemplary screen display showing a data display area and a blank form-design area.

FIG. 4 shows an example data display area 108 in which hierarchical data is displayed as icons with associated names. For instance, the depicted data includes such items of data named "myFields," "string1," "xhtml1," "container1," "repeating_item," "string1," and so forth to "boolean2". Each of these named icons represents a part of the hierarchical data. These icons make it easier to understand the hierarchical data, especially for a designer unfamiliar with the often-complex details of hierarchical data. These icons can also make it easier for a designer to select particular parts of the hierarchical data. Whether with icons, text, or otherwise, the system 100 makes the structure of the hierarchical data apparent to a designer.

In FIG. 4, the hierarchical data is arranged in the form of a tree. The named icons are representative of nodes in the tree. The tree structure lends a visually hierarchy to the data, where certain nodes are nested within other nodes. For instance, a parent "container3" node 440 contains a "string5" node 442 and a "boolean2" node 444, which is set forth graphically by the "string5" node 442 and the "boolean2" node 444 being indented relative to the "container3" node 440.

Nodes, as well as parts of hierarchical data not presented in a tree, have a structure. This structure can include rules governing the node itself or the type of information that the node can contain.

There are various types of languages with which hierarchical data files are written, such as markup languages. One of the most common types of markup language is the eXtensible Markup Language, or XML. Markup-language data is often used to transfer, store, or represent data.

Selecting a Part or Node of the Hierarchical Data

At block 304, the system 100 enables selection of a portion of the hierarchical data. In FIG. 4, the designer has selected the "string1" node 418 as represented by the highlight bar placed at the node. Selection can be made using conventional user interface techniques, such as a computer mouse pointer, a stylus, a touch screen, or some other input mechanism that facilitates selection of a specific item. The designer selects a portion of hierarchical data by clicking on (or tapping, or otherwise identifying) the icon or text name representing a particular part of the hierarchical data.

Components Associated with the Selected Portion

Once the system 100 receives a selection of a portion of the hierarchical data, the system 100 displays one or more components associated with the selected portion of the hierarchical data (block 306 in FIG. 3). The components can be displayed in various ways such that a designer is able to readily choose among possible components (if a choice needs to be made). The components can be depicted in a separate area, such as a separate graphical window or pane.

Figure 5:
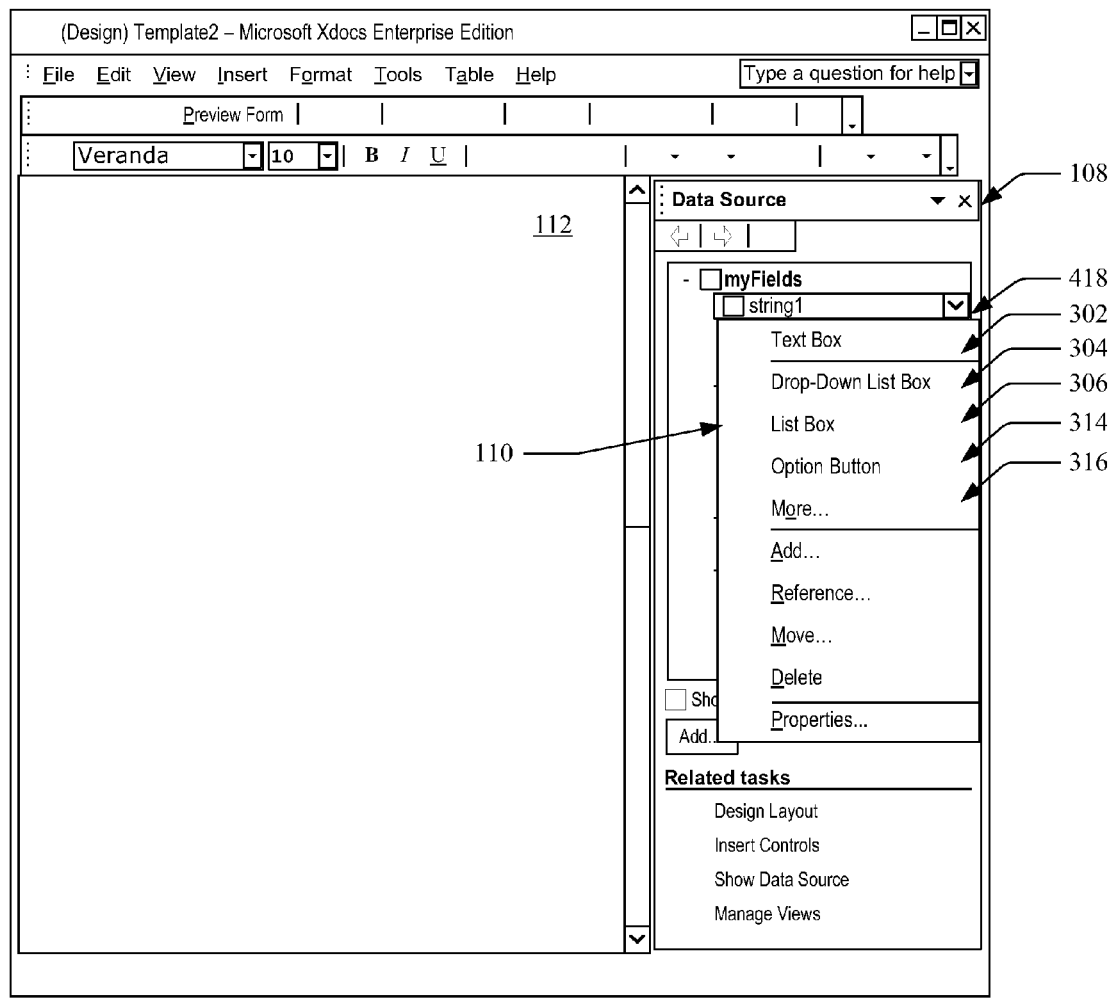
FIG. 5 illustrates an exemplary screen display showing part of a data display area, a component display area, and a blank form-design area.

FIG. 5 illustrates an exemplary component display area 110 that is depicted upon selection of the "string1" node 418 in the data display area 108. The component display area 110 is illustrated as a pop-up menu or list that is positioned just beneath the selected data item and overlies the data display area 108. The component display area 110 contains a list of components that are associated with the selected node 418. That is, each component sets forth how the selected part of the hierarchical data could be represented in the electronic form. In this example, the selected "string1" node 418 can be represented by such components as a text box 502, a drop-down list box 504, a list box 506, an option button 514, a check box 516, and so on. The component display area 110 may further include other menu options that enhance the usability for the designer. These options may be general or context specific.

Representative options "Add", "Reference", "Move", "Delete", and "Properties" are illustrated in FIG. 5.

When a selection is made, the component display area 110 can present a restriction of the entire library of components known to the system 100. In such a case, the component display area 110 presents a scrollable list or some other mechanism that allows the designer to move through the library and select the desired component. Alternatively, the system 100 can display a reduced set of components that are associated with the selected portion of the hierarchical data. The system 100 identifies which components are associated with a selected portion of hierarchical data according its structure. Thus, if the structure of the portion of hierarchical data allows for storage of only textual data, the system will provide as a default only those components that allow for entry of just textual data. Likewise, if the structure of a portion allows for multiple fields of data, the system will provide to a designer components allowing for multiple fields, such as components allowing for repeating sections and/or a repeating table, like the drop-down list box 504 and the list box 506 of FIG. 5.

Components may be constructed in various ways. Components can be written in a transformation-language. These transformation-language components are code that can be used to transform pieces of markup-language data (a type of hierarchical data) into visual and/or structural fields in an electronic form that are consistent with the structure of the markup-language data. Examples of transformation-language components include files, applets, or other code written in Cascading Style-Sheet Language (CSS) and eXtensible Style-sheet Language Transformation (XSLT) languages.

In one implementation, transformation-language components are written in XSLT. XSLT components include those shown in the component display area 110: the text box 502, the drop-down list box 504, the list box 506, the option button 514, and the check box 516. These components in the component display area 110 are represented with icons that approximate the data-entry fields that the components can be used to create in an electronic form.

For example, if a designer chooses a piece of the markup-language data and the piece has only Boolean information or a structure allowing for only Boolean information (e.g., yes or no) (e.g., the "boolean2" node 444 in FIG. 4), the system 100 will display components compatible with the Boolean information and/or structure. The option button 514 or the check box 516 in the component display area 110 of FIG. 5 are examples of compatible components.

Components, whether transformation-language components or otherwise, can be used to create operable fields in electronic forms. Operable fields, such as data entry fields, when integrated into an electronic form, can display or receive information. The information received can be input by a user of an electronic form containing the data-entry field or the information can be copied (automatically or otherwise) from a data source of hierarchical data containing the information. The "Purpose" data-entry field 208 of FIG. 2, is one example of a data-entry field.

The components associated with the selected part of the hierarchical data, whether a transformation-language component or otherwise, are displayed in component display area 110 so that a designer can chose between them. Components do not need to be displayed, however, if one is chosen by the system 100, such as by a particular component being a default choice or if there is only one component associated with a selected portion of hierarchical data.

In one implementation, the system 100 chooses the component (such as by intelligently determining a component most likely to be desired based on the designer's history of choosing or an algorithm), lessening the need for displaying multiple components unless a designer requests.

Choosing a Component and Other Preferences

At block 308, the system 100 enables the designer to choose one of the components that is associated with the selected portion of hierarchical data. The designer can make this choice using similar user interface techniques that are employed to select a particular portion of hierarchical data. The system 100 can, for instance, enable a designer to select a component by clicking on an icon or text for a component in the component display area 110 (FIG. 5). Alternatively, the system 100 can enable a designer to drag and drop a component from the component display area 110 to the form-design area 112, thereby choosing the component and the placement of the component on the form-design area 112. The system 100 then displays the selected component on the form-design area 112. The selected component can be displayed at a place on the form-design area 112 where a designer selects, or placed where it will not obscure another component on the form-design area 112.

Figure 6:
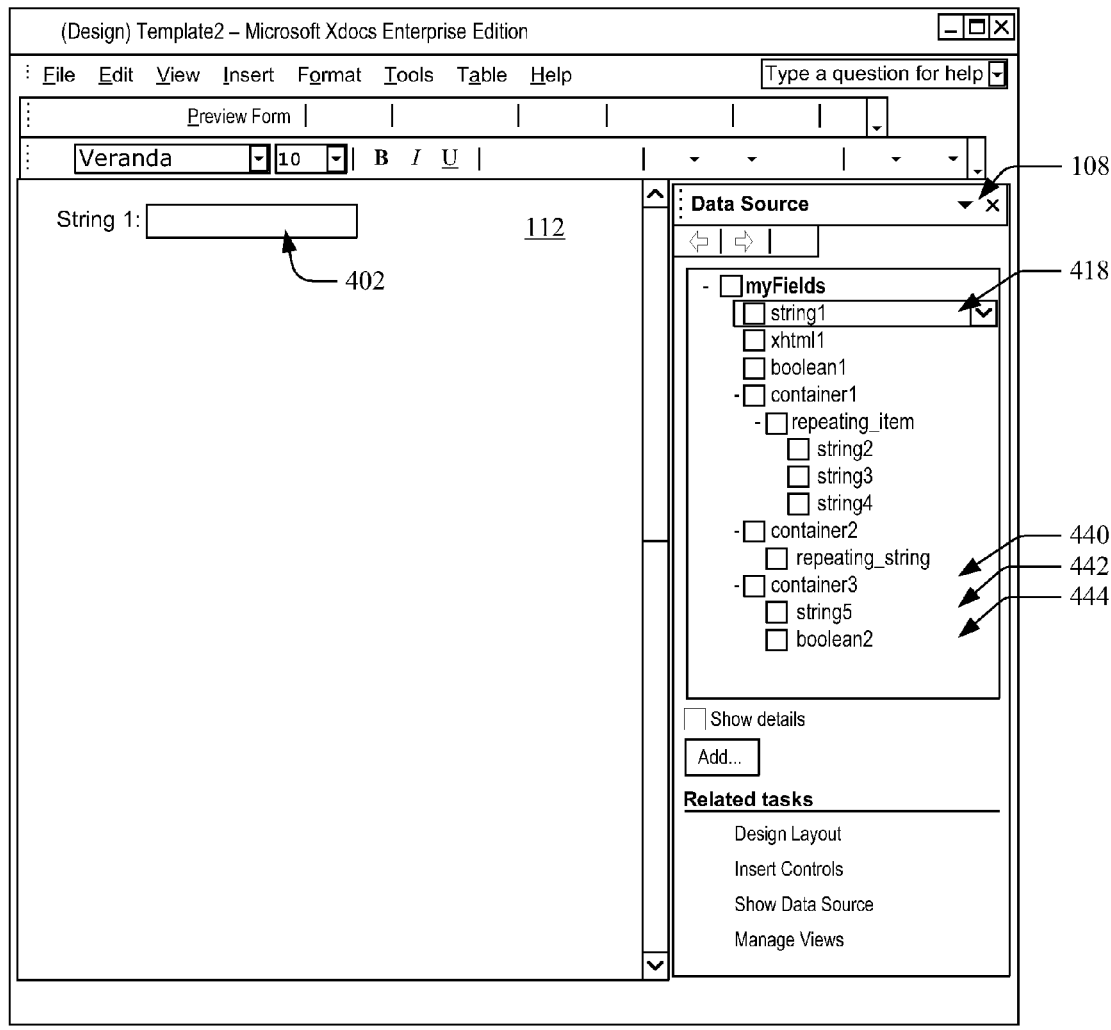
FIG. 6 illustrates an exemplary screen display showing a data display area and a form-design area.

Continuing our example, after the designer selects the string1 node 418 in the data display area 108 (FIG. 4) to invoke the list of components in component display area 110 (FIG. 5), the designer can choose one of the components in component display area 110. In this example, the designer chooses the text box 502 and identifies where the field created with the component is to be positioned in the form-design area 112. This can be done by dragging and dropping the component from the list 110 onto the form-design area 112, such as the upper left hand corner of form-design area 112 as shown in FIG. 6. The forms-designer application 126 will display the selected text box 502 component substantially as it will appear as an operable field (a text box representation 602, which has the corresponding name "String 1").

However and wherever placed, components generally can be moved and altered by a designer to allow the designer to create an electronic form to match the designer's preference. In one implementation, the system 100 enables a designer to place a component onto the form-design area 112 wherever the designer chooses. This allows the designer freedom to easily organize and create a view (and eventually an electronic form) of one or more components on the form-design area 112.

The system 100 enables a designer not only to choose a particular component, but also other preferences. These preferences can include the placement on the form-design area 112 of each component. These preferences can also include alterations to the components, like the size, font, color, orientation, and the like.

The system 100 also allows a designer to request changes to the form-design area 112 that are not related to components, such as adding text and graphics to the form-design area 112 (such as the header "Travel Itinerary" shown in FIG. 2's example of the form-design area 112). In one implementation, these preferences can include most of the preferences available to a user of a typical word-processing program.

A designer can choose additional parts of an arrangement of hierarchical data and select additional components associated with the chosen parts of hierarchical data to add to the form-design area 112. Continuing the above example, after the text box representation 602 is displayed on the form-design area of FIG. 6, a designer could continue to select the same or another portion of the hierarchical data in the data display area 108 and position the corresponding component onto the form.

Figure 7:
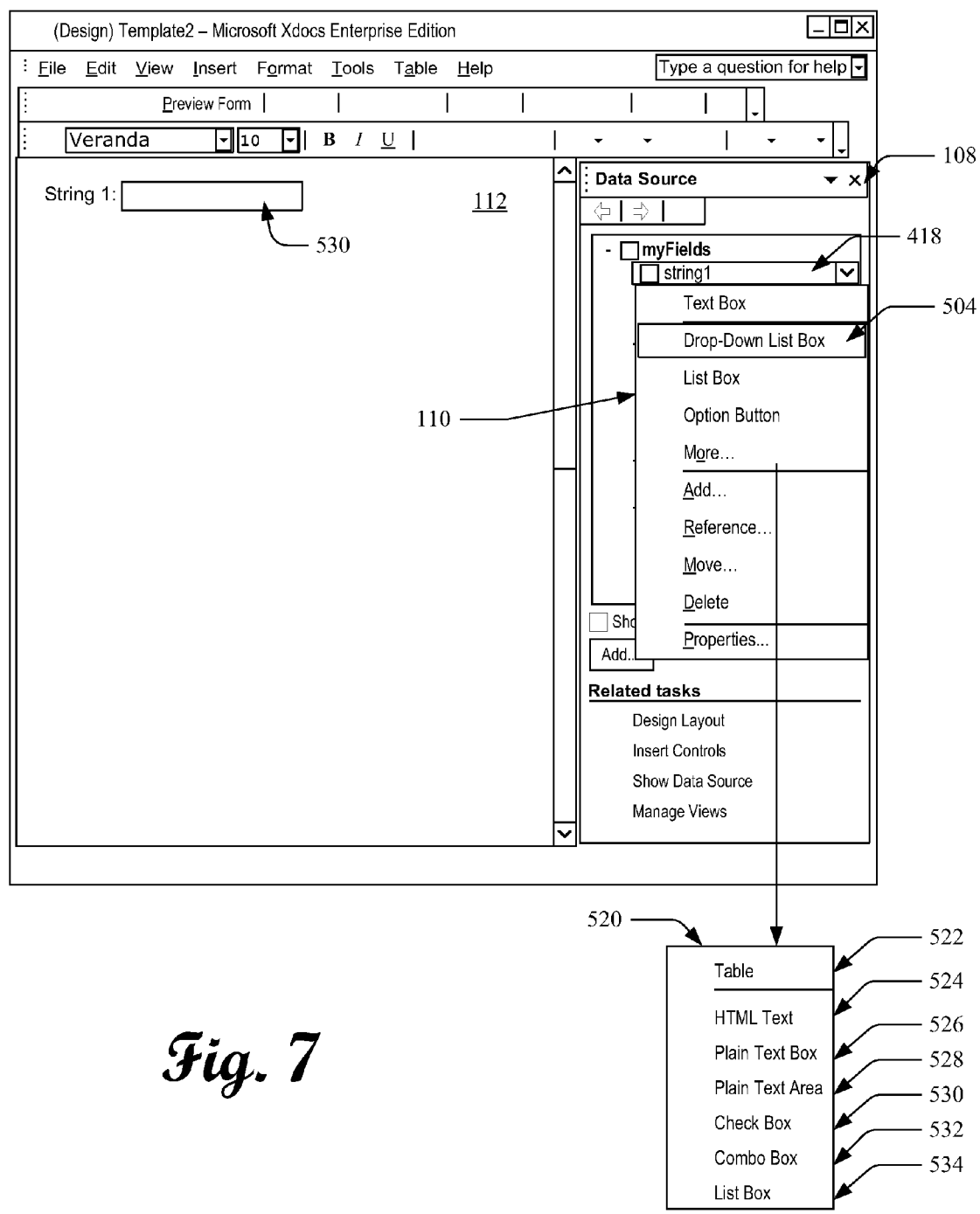
FIG. 7 illustrates an exemplary screen display showing a data display area, an auxiliary component display area, a component display area, and a form-design area.

FIG. 7 shows an example of a designer selecting the "string1 node 418 and then choosing a different component, in this case a drop-down list box 504 from the component display area 110. This example also illustrates another feature, in that the selection of a component may invoke another menu that presents further design options for the selected component. Here, selection of the drop-down list box 504 causes a secondary or auxiliary component display area 720 to be depicted on the screen (although it is illustrated in FIG. 7 off the screen for clarity and purposes of discussion in relation to the underlying areas 110 and 108). The location of this display area 720 is configurable, and may be located just beneath the selected drop-down list box item in display area 110, or elsewhere. The auxiliary component display area 720 includes various component alternatives for implementing the drop-down list box 504, including a table 722, an HTML text 724, a plain text box 726, a plain text area 728, a check box 730, a combo box 732, and a list box 734.

Figure 8:
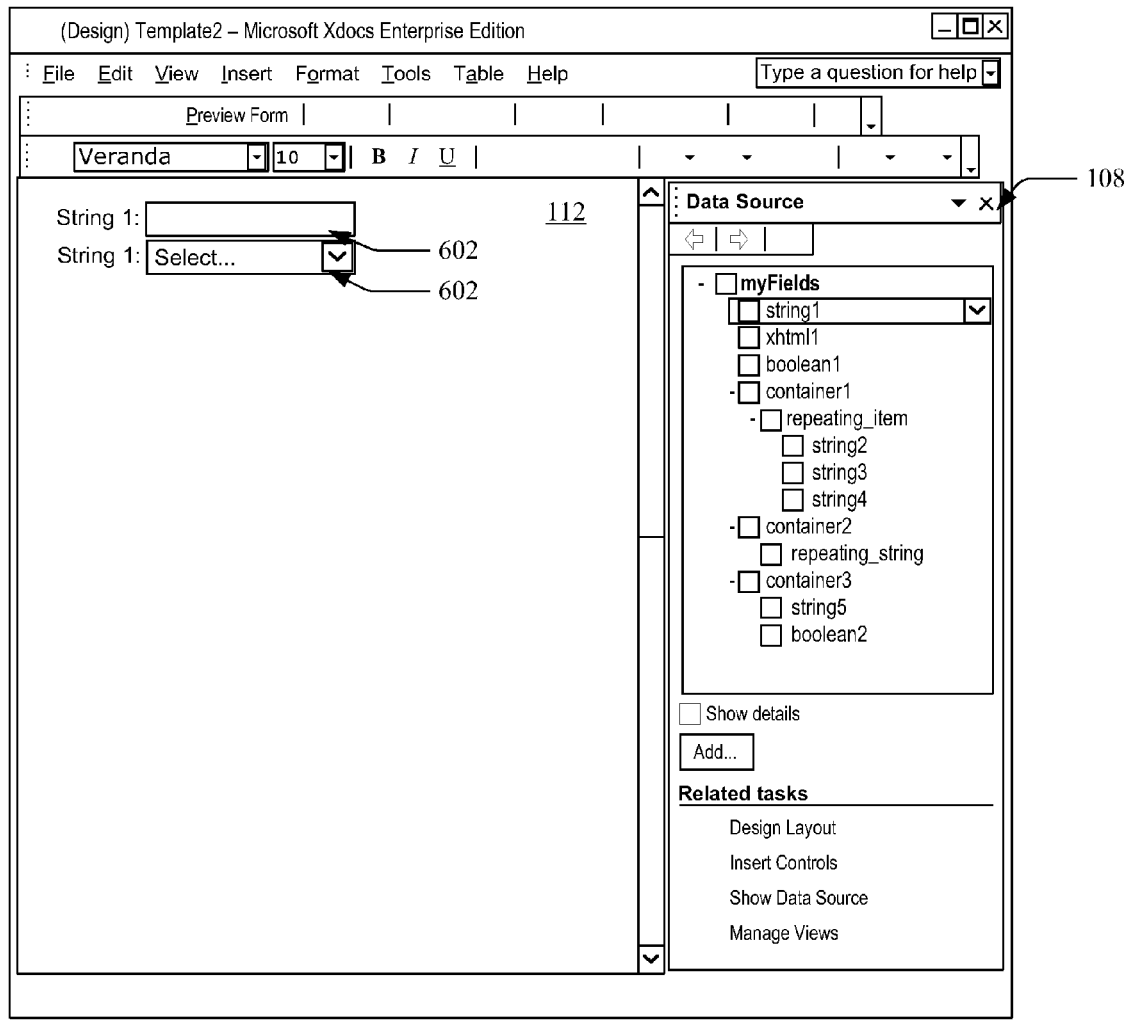
FIG. 8 illustrates an exemplary screen display showing a data display area and a form-design area.

From this auxiliary list, suppose the designer chooses the combo box 732 and positions that component onto the form-display area 112 just beneath the text box representation 602. The forms-designer application 126 uses the selected combo box 732 to represent what will be an operable drop-down list data-entry field in the electronic form (a drop-down representation 802 shown in FIG. 8). Since the component is derived from the "string1" node 418 in data display area 108, the drop-down representation 802 is initially given the name "String 1". This name can be subsequently edited, if the designer so desires.

A designer can continue to add components and make alterations to the form-design screen 112. By allowing additions and alterations to the form-design screen 112, the system 100 enables a designer to easily and intuitively create an electronic form built to the designer's preferences. A designer could, for example, continue to add components and make alterations to the components and form-design area 112 until the designer has created a form-design area like the form-design area 112 of FIG. 2, entitled "Travel Itinerary."

Generating an Electronic Form

At block 310, the system 100 generates an electronic form. Components placed within the form-design area 112 are used to generate an electronic form. The electronic form is the product of the placement of various components on the form-design area 112, and can include where the components were placed, how they were altered, and any stylistic changes made to how the components are displayed on or to the form-design area. Once created, the electronic form visually mimics the look of the form-design area at the time the designer decided to create the electronic form.

How the system 100 generates an electronic form will be set forth in greater detail below.

Techniques for Creating Electronic Forms

Various implementations of a form-designing process are set forth below. The form designing process can begin with a generalized instance process 900, and can include a process 1000 for rendering transformation-language components and generating a transformation-language document from an annotated rendering-language document.

Creating a Generalized Instance

Figure 9:
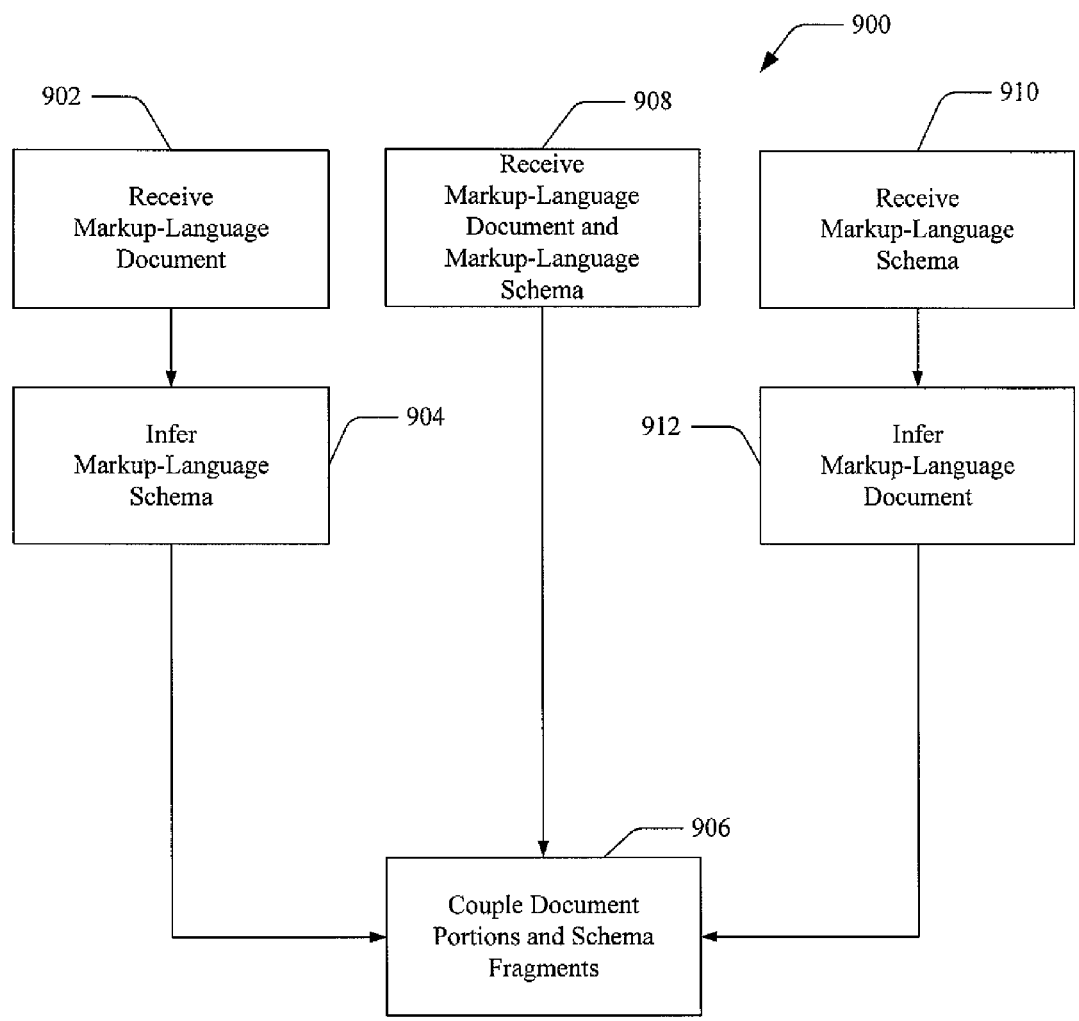
FIG. 9 is a flow diagram of an exemplary process for coupling a markup-language document and schema.

FIG. 9 sets forth a process 900 for creating a generalized instance from one or both of a markup-language document and a markup-language schema. A generalized instance contains hierarchical data. The process 900 is illustrated as a series of blocks representing individual operations or acts performed by the system 100. The process 900 may be implemented in any suitable hardware, software, firmware, or combination thereof. In the case of software and firmware, the process 900 represents a set of operations implemented as computer-executable instructions stored in memory and executable by one or more processors.

Three ways to create a generalized instance are set forth in process 900. In the first, the system 100 receives only a markup-language document. In the second, the system 100 receives both a markup-language document and its markup-language schema. In the third, the system 100 receives only a markup-language schema.

In the first way, the system 100 creates a generalized instance from only a markup-language document. The system 100 does so following blocks 902, 904, and 906 of FIG. 9.

In the block 902, the system 100 receives a markup-language document without its associated schema. The markup-language document received is a document containing hierarchical data that conforms to a markup-language schema, but the markup-language schema is not known. To determine or fabricate a schema for the markup-language document, the system 100 analyzes the structure in which the markup-language document conforms and/or investigates clues or references in the markup-language document.

With this information, the system 100 infers a markup-language schema according to the block 904. The system 100 can infer the markup-language schema by building it based on the structure of the markup-language document. The system 100 can also infer the markup-language schema by searching sources containing schemas until it finds a schema matching the structure of or reference in the markup-language document. The World Wide Web Consortium ("W3C") is a source for the language used to describe some markup-language schemas.

In block 906, the system 100 couples the markup-language document and its associated markup-language schema. Either of the markup-language document or markup-language schema may have been inferred. The generalized instance contains a hierarchical arrangement of data with each part of the hierarchical data also containing or referencing each part of the schema that governs that part of the hierarchical data.

In one implementation, the system 100 couples the markup-language document and its schema modularly. The system 100 analyzes the structure of the markup-language document and the structure allowed by its schema to determine how the markup-language document can be modularized. The system 100 breaks the markup-language document into parts (referred to sometimes as "nodes" when the generalized instance is arranged as a tree). Based on each of these parts of the markup-language document, the system 100 associates pieces of the schema that govern the structure of a particular part to that particular part. By so doing, the markup-language document and its schema can be broken down into parts. These modular parts each contain a part of the markup-language document and a part of the markup-language schema governing that part.

These parts are then arranged into a generalized instance. The generalized instance contains an arrangement of parts, each part containing a piece of the markup-language document and piece of the markup-language schema governing that piece of the markup-language document.

For example, in FIG. 6, a "container3" node 440 is a part of a larger markup-language document (entitled "My Fields") associated with a markup-language schema. The "container3" node 440 contains information on its own and the information of a "string5" node 442 and a "boolean2" node 444. The "container3" node 440 also, if it is part of a generalized instance, contains the part of the schema associated with the markup-language document that governs the container3 node 440, the string5 node 442, and the boolean2 node 444. Thus, that part of the markup-language document that is called the container3 node 440 is modular by virtue of being coupled with the schema governing it. So each part of a markup-language document that is coupled with its markup-language schema is independent and modular. The generalized instance is a compilation of all the coupled parts.

One of the benefits of creating a generalized instance is that the system 100, when it receives a selection of one part of hierarchical data that is modularized into a generalized instance, can more easily associate that selected part to one or more components. The system 100, with just the selected part, can determine what rules govern that part, such as the type of information the part can contain, how it is arranged, how it can be used, and the like. Thus, the system 100 can more easily (and in some cases more accurately) associate particular components with the selected part of the hierarchical data when it is modularized into a generalized instance.

In one implementation, a generalized instance describes, for each part of a hierarchical data file, every possible type of information that can be contained within that part. With this information, the system 100 can more easily determine which components to associate with a selected part of hierarchical data that have been coupled or modularized into a generalized instance.

In the second way to create a generalized instance, the system 100 creates a generalized instance from a markup-language document and its markup-language schema. The system 100 does so following blocks 908 and 906 of FIG. 9.

In the block 908, the system 100 receives a markup-language document and its associated schema. The markup-language schema describes the rules and/or structure governing the markup-language document received but can also govern other markup-language documents as well. With the markup-language document and its schema, the system 100 creates a generalized instance as set forth in block 906 above.

In the third way, the system 100 creates a generalized instance from only a markup-language schema. The system 100 does so following blocks 910, 912, and 906 of FIG. 9.

In the block 910, the system 100 receives a markup-language schema without a conforming markup-language document. This markup-language schema can be one of many different types, including a schema not conforming to a W3C standard or one having an arbitrary syntax.

The system 100, through the forms-designer application 126, analyzes the markup-language schema to determine the range of markup-language documents that can conform to the markup-language schema (block 912). One of the powerful aspects of the forms-designer application 126 is that it can determine this range of documents even when the markup-language schema defines an arbitrary syntax or does not conform to a known standard. This ability enables the forms-designer application 126 to create generalized instances for these schemas. With these generalized instances, it can build electronic forms for use with data files having non-standard or arbitrary structures.

With the range of markup-language documents that can conform to the markup-language schema, the system 100 infers a markup-language document that conforms to the markup-language schema. With the markup-language document and its schema, the system 100 creates a generalized instance as set forth in block 906 above.

Rendering-Language and Transformation-Language Documents

Figure 10:
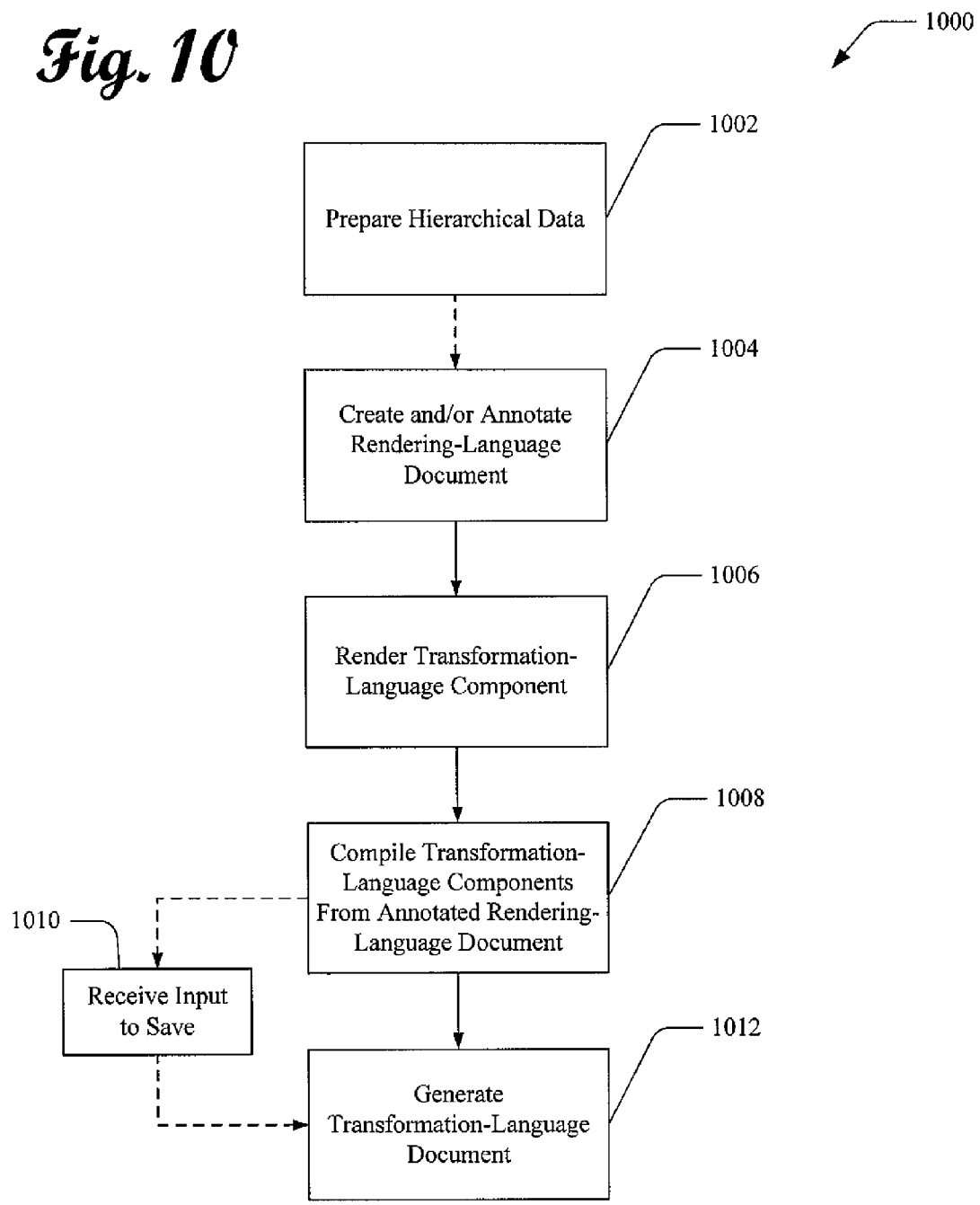
FIG. 10 is a flow diagram of an exemplary process for rendering transformation-language components and generating a transformation-language document.

FIG. 10 sets forth a process 1000 for rendering of transformation-language components and generating a transformation-language document.

The process 1000 is illustrated as a series of blocks representing individual operations or acts performed by the system 100. The process 1000 may be implemented in any suitable hardware, software, firmware, or combination thereof. In the case of software and firmware, the process 1000 represents a set of operations implemented as computer-executable instructions stored in memory and executable by one or more processors.

The process 1000 begins with a block 1002, where the system 100 prepares hierarchical data into a generalized instance, as set forth in the description of the process 900. The process 1000 can start with a generalized instance through block 1002 or otherwise, so long as the hierarchical data is displayed.

In the following description of the process 1000, hierarchical data is sometimes referred to as a markup-language document and components as transformation-language components. It is to be understood that these terms are used to aid in the clear exposition of the process 1000, and are not in any way limiting of the process 1000.

Creating and Annotating a Rendering-Language Document

In block 1004, the system 100 creates and/or annotates a rendering-language document. A rendering-language document is a document or file that, when executed (alone or in conjunction with other files or applications) displays a view on a screen. One example is a file that displays a webpage. This type of file gives a reader a view of information, such as through text, graphics, and the like. A rendering-language document is not the same thing as an electronic form, but rather is a view of what an electronic form can look like. Thus, a rendering-language document can create views seen in the form-design area 112.

As part of the block 1004, the system 100 creates a rendering-language document by applying one or more components on one or more parts of hierarchical data. In the following description, the components are written in a transformation-language and the hierarchical data includes a markup-language document.

Rendering-language documents can be written in HTML and XHTML document, other machine-language documents, or other documents adept at viewing or displaying. To create rendering-language documents written in XHTML, the system 100 applies one or more XSLT transformation-language components on one or more nodes or portions of an XML document.

Once the system 100 creates a rendering-language document, the system 100 can annotate the rendering-language document to make it easier to create an electronic form from the rendering-language document.

These annotations include two primary types. One annotation indicates the type of transformation-language component selected. Another annotation indicates the node of the tree of hierarchical data selected (or part of the hierarchical data). The placement chosen for each component on the form-design area 112 can be part of the rendering-language document, but is not generally considered an annotation. Thus, the product to this point is an annotated rendering-language document (such as an XHTML document) that can render (shows a view of) the selected transformation-language component (such as an XSLT component) on the form-design area 112 (such as is set forth in FIG. 2).

Annotating the rendering-language document by adding this information enriches the rendering-language document so that it contains information for the system 100 to later analyze the rendering-language document to help create an electronic form. The system 100 can, for example, identify the annotations in an annotated rendering-language document to create an electronic form visually mimicking the view created by the annotated rendering-language document. Thus, in this example, the system 100 can create an electronic form mimicking the view of the transformation-language components set forth and manipulated by a designer in the form-design area 112 (such as set forth in FIG. 2). With the electronic form a user can enter information into fields of the electronic form that can be retained by a file. The file, in some cases, mimics the structure of the hierarchical data file from which the electronic form was created, such as an XML document.

Rendering Transformation-Language Components with a Rendering-Language Document

Once this rendering-language document is created and/or annotated, it can be used by the system 100 to render transformation-language components, as set forth in a block 1006. Typically, the system 100 renders the transformation-language components on a display, such as the form-design area 112 of the screen 102 of FIG. 1.

Based on the structure of the rendering-language document, the system 100 can render transformation-language components in various ways. For example, the system 100 can render the text box 502 of FIG. 5 (which is a component) to look like the box set forth in FIG. 6 as the text box representation 602.

In FIG. 2, for instance, the system 100 renders transformation-language components with a rendering-language document to create the view set forth in the form-design area 112, which mimics how the electronic form will appear.

Thus, using XSLT transformation-language components, XML hierarchical data, and XHTML rendering-language documents as examples, once the system 100 receives from a designer a selection and placement of one of a list of XSLT transformation-language components associated with a selected node of the XML document, such as by the designer clicking on the XSLT transformation-language component's icon or text and dragging the icon or text over to the form-design area 112, the system 100 renders the transformation-language component.

To do so, the system 100 applies the selected XSLT transformation-language component to the XML hierarchical data represented by the selected node or portion. By so doing, the system 100 creates an XHTML document that renders a visual representation of the XSLT transformation-language component on the form-design area 112 at the place the designer selected.

Compiling Transformation-Language Components into a Transformation-Language Document In block 1008, the system 100 then determines, from the annotated rendering-language document, the transformation-language components used and the location of the nodes in the markup-language document that are associated with each transformation-language component rendered. In block 1012, the system generates a transformation-language document from this information (as well as the information regarding the placement, style, and formatting of transformation-language components included within the rendering-language document), either after or independent of a designer saving the form-design screen 112 (block 1010).

The transformation-language document is the document ultimately created and saved by the system 100, while the rendering-language document is no longer needed. This is because the transformation-language document can create a view of hierarchical data mimicking the view created by the rendering-language document that was used to create the transformation-language document. The transformation-language document, when applied to a markup-language document having the same schema as the one from which the parts were chosen by the designer, will create an electronic form visually mimicking the rendering made by the rendering-language document. The electronic form created, however, can contain fields that can be populated by information from a user or from another markup-language document.

The electronic form created can be used by a user to key in information into fields, such as the purpose of an appointment (see the form-design area 112 of FIG. 2). The electronic form created can also have its fields populated by other hierarchical data files, thereby reducing the labor needed to key-in information by hand. One way in which an electronic form can be created with one or more fields already populated, is by applying a transformation-language document to a markup-language data file containing information. The result can be an electronic form with the fields filled where nodes of a markup-language data file corresponding to those fields contain information.

Thus, a designer not knowledgeable about transformation-language documents or programming can, in an easy-to-use way, create an electronic form from a markup-language document. This electronic form also can be flexibly created, allowing a designer to choose various transformation-language components, change the orientation and placement of the transformation-language components, change the font, color, size, and make other word-processor-like changes to the transformation-language components, so that the electronic form will have the structure and look intended by the designer.

The system 100 can even create XSLT transformation-language documents, which are especially complex. In this case, a designer having little knowledge about the XSLT language can create, using XSLT transformation-language components, XML hierarchical data, and an XHTML rendering-language document as examples, an XSLT transformation-language document.

A Computer System

Figure 11:
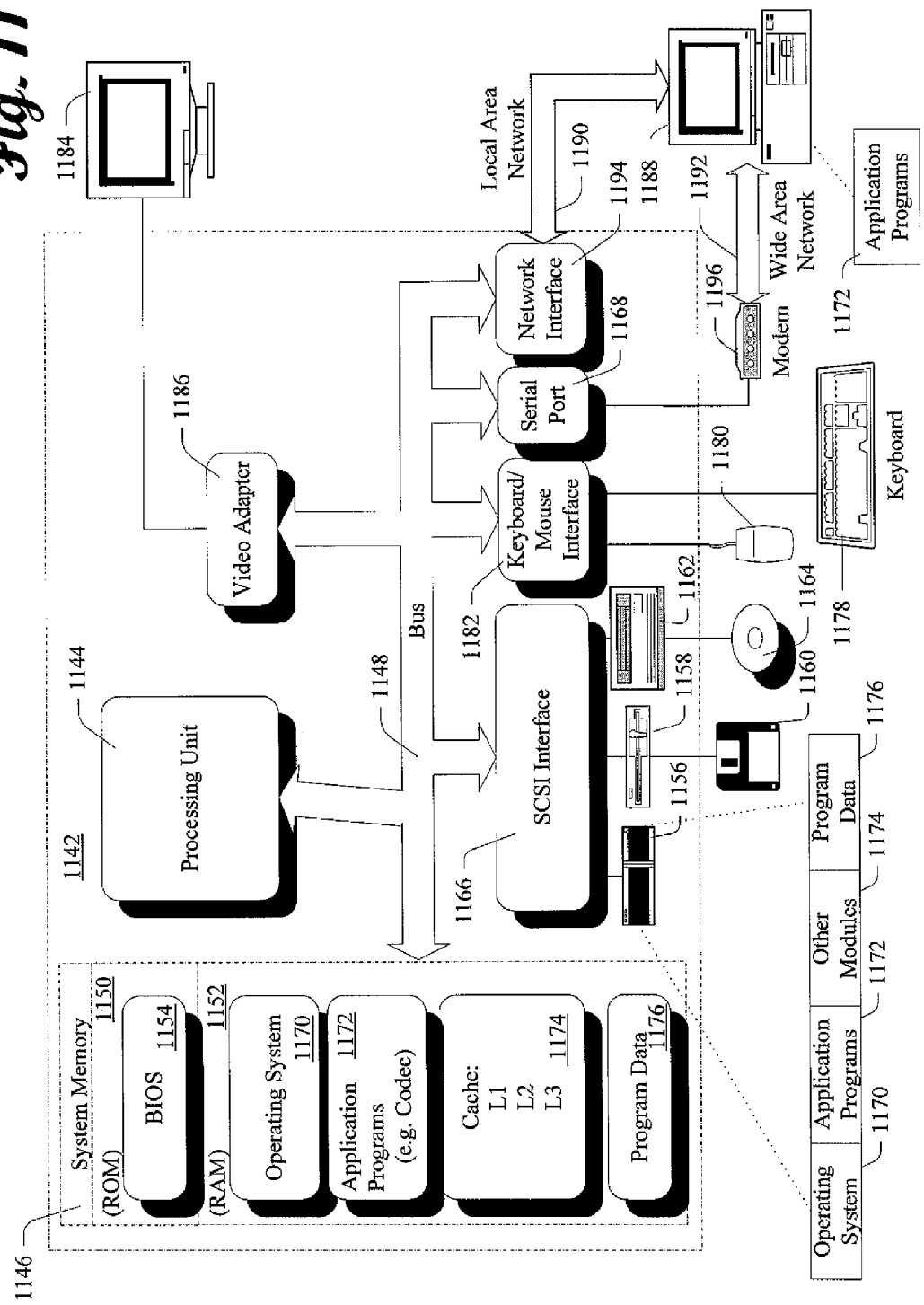
FIG. 11 is a block diagram of a computer system that is capable of supporting an electronic-form generation process.

FIG. 11 shows an exemplary computer system that can be used to implement the processes described herein. Computer 1142 includes one or more processors or processing units 1144, a system memory 1146, and a bus 1148 that couples various system components including the system memory 1146 to processors 1144. The bus 1148 represents one or more of any of several types of bus structures, including a memory bus or memory controller, a peripheral bus, an accelerated graphics port, and a processor or local bus using any of a variety of bus architectures. The system memory 1146 includes read only memory (ROM) 1150 and random access memory (RAM) 1152. A basic input/output system (BIOS) 1154, containing the basic routines that help to transfer information between elements within computer 1142, such as during start-up, is stored in ROM 1150.

Computer 1142 further includes a hard disk drive 1156 for reading from and writing to a hard disk (not shown), a magnetic disk drive 1158 for reading from and writing to a removable magnetic disk 1160, and an optical disk drive 1162 for reading from or writing to a removable optical disk 1164 such as a CD ROM or other optical media. The hard disk drive 1156, magnetic disk drive 1158, and optical disk drive 1162 are connected to the bus 1148 by an SCSI interface 1166 or some other appropriate interface. The drives and their associated computer-readable media provide nonvolatile storage of computer-readable instructions, data structures, program modules and other data for computer 1142. Although the exemplary environment described herein employs a hard disk, a removable magnetic disk 1160 and a removable optical disk 1164, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1156, magnetic disk 1160, optical disk 1164, ROM 1150, or RAM 1152, including an operating system 1170, one or more forms-designer applications 1172, other program modules 1174, and program data 1176. A user may enter commands and information into computer 1142 through input devices such as a keyboard 1178 and a pointing device 1180. Other input devices (not shown) may include a microphone, joystick, game pad, satellite dish, scanner, or the like. These and other input devices are connected to the processing unit 1144 through an interface 1182 that is coupled to the bus 1148. A monitor 1184 or other type of display device is also connected to the bus 1148 via an interface, such as a video adapter 1186. In addition to the monitor, personal computers typically include other peripheral output devices (not shown) such as speakers and printers.

Computer 1142 commonly operates in a networked environment using logical connections to one or more remote computers, such as a remote computer 1188. The remote computer 1188 may be another personal computer, a server, a router, a network PC, a peer device or other common network node, and typically includes many or all of the elements described above relative to computer 1142. The logical connections depicted in FIG. 11 include a local area network (LAN) 1190 and a wide area network (WAN) 1192. Such networking environments are commonplace in offices, enterprise-wide computer networks, intranets, and the Internet.

When used in a LAN networking environment, computer 1142 is connected to the local network through a network interface or adapter 1194. When used in a WAN networking environment, computer 1142 typically includes a modem 1196 or other means for establishing communications over the wide area network 1192, such as the Internet. The modem 1196, which may be internal or external, is connected to the bus 1148 via a serial port interface 1168. In a networked environment, program modules depicted relative to the personal computer 1142, or portions thereof, may be stored in the remote memory storage device. It will be appreciated that the network connections shown are exemplary and other means of establishing a communications link between the computers may be used.

Generally, the data processors of computer 1142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The above-described system and method for generating electronic forms allows a designer to easily create electronic forms from a file of hierarchical data, even if the designer has only very basic skills. The above-described system and method also allows a designer to create, with the click of a mouse, XSLT files capable of transforming XML documents into XHTML files simply by clicking on parts of an XML document and/or its schema. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    displaying a visual representation of hierarchical data in a first area of a screen, the hierarchical data displayed in a tree arrangement of XML data having portions represented by nodes in the tree arrangement;
    receiving input selecting a node of the hierarchical data;
    identifying a reduced set of transformation-language components that are associated with the selected node of hierarchical data based on a structure of the selected node of hierarchical data, the reduced set of transformation-language components identified from a full set of available transformation language components, the full set of available transformation language components including at least one more transformation language component than the reduced set of transformation language components;
    displaying the reduced set of transformation-language components in a component display area, the displayed reduced set of transformation-language components including at least two of a text box, a drop-down list box, a list box, an option button, or a check box;
    receiving input selecting one of the reduced set of transformation-language components that is associated with the selected node of hierarchical data to place the selected transformation-language component on a second area of the screen; and
    rendering the selected transformation-language component on the second area of the screen, the rendering comprising creating a rendering-language document to aid in rendering the selected transformation-language component on the second area of the screen and annotating the rendering-language document to include a reference to the selected transformation-language component; and
    generating a transformation-language document using the annotated rendering-language document.

2. The method of claim 1, further comprising receiving input to save the second area of the screen prior to generating the transformation-language document.

3. The method of claim 1, wherein annotating the rendering-language document further includes reference to a placement of the selected transformation-language component.

4. The method of claim 1, further comprising:
    accessing the selected transformation-language component referenced in the annotated rendering-language document; and
    compiling the accessed transformation-language component into the transformation-language document.

5. The method of claim 1 wherein identifying the reduced set of transformation-language is further based on a data type of the selected node of the hierarchical data.

6. A method comprising:
    displaying hierarchical data in a tree arrangement of XML data having portions represented by nodes in the tree arrangement;
    receiving input to select a node from the tree-arrangement of XML data;
    identifying a reduced set of XSLT components that are associated with the selected node of the XML data based on a structure of the selected node of the XML data, the reduced set of XSLT components identified from a full set of available XSLT components, the full set of available XSLT components including at least one more XSLT component than the reduced set of XSLT components;
    displaying the reduced set of XSLT components in a component display area, the displayed reduced set of XSLT components including at least two of a text box, a drop-down list box, a list box, an option button, or a check box;
    receiving input selecting one of the reduced set of XSLT components that is associated with the selected node of the XML data to place the selected XSLT component on a second area of the screen;
    rendering the selected XSLT component on the second area of the screen, the rendering comprising creating an XHTML document to aid in rendering the selected XSLT component on the second area of the screen and annotating the XHTML document to include a reference to the selected XSLT component; and
    generating an XSLT file using the annotated XHTML document.

7. The method of claim 6, wherein identifying the reduced set of XSLT components based on the selected node of the XML data is further based on a schema governing the selected node of the XML data.

8. The method of claim 6, wherein the XML data is part of a generalized instance.

9. A method comprising:
    receiving an XML document having a structure, the structure comprising a tree arrangement of data having portions represented by nodes in the tree arrangement;
    inferring an XML schema based on the structure of the XML document by breaking the XML document into nodes;
    coupling the nodes of the XML document with fragments of the XML schema;
    identifying a reduced set of available components to associate with the coupled portions, the reduced set of available components identified from a full set of available components based on a structure of the coupled portions, the full set of available components including at least one more available component than the reduced set of available components;
    presenting the reduced set of available components to a designer to enable the designer to associate two or more components of the reduced set of available components with the coupled portions, the two or more components including at least two of a text box, a drop-down list box, a list box, an option button, or a check box;
    presenting the coupled portions to the designer;
    enabling the designer to select one or more of the coupled portions;

enabling the designer to associate the one or more components with the selected one or more of the coupled portions; and creating an electronic form containing data-entry fields corresponding to the two or more components associated with the coupled portions.

10. The method of claim 9, wherein the coupled portions contain information setting forth all possible documents for the coupled portion.

11. A method comprising:

receiving an XML schema;

inferring an XML document having a structure based on the XML schema, the structure comprising a tree arrangement of data having portions represented by nodes in the tree arrangement;

coupling the nodes of the XML document with fragments of the XML schema;

identifying a reduced set of available components to associate with the coupled portions, the reduced set of available components identified from a full set of available components based on a structure of the coupled portions, the full set of available components including at least one more available component than the reduced set of available components;

presenting the reduced set of available components to a designer to enable the designer to associate two or more components of the reduced set of available components with the coupled portions, the two or more components including at least two of a text box, a drop-down list box, a list box, an option button, or a check box;

presenting the coupled portions to the designer;

enabling the designer to select one or more of the coupled portions;

enabling the designer to associate the one or more components with the selected one or more of the coupled portions; and creating an electronic form containing data-entry fields corresponding to the two or more components associated with the coupled portions.

12. The method of claim 11, wherein the coupled portions contain information setting forth all possible documents for the coupled portion.

13. A method comprising:

receiving an XML document having a structure, the structure comprising a tree arrangement of data having portions represented by nodes in the tree arrangement;

receiving an XML schema related to the XML document;

coupling the nodes of the XML document with fragments of the XML schema;

identifying a reduced set of available components to associate with the coupled portions, the reduced set of available components identified from a full set of available components based on a structure of the coupled portions, the full set of available components including at least one more available component than the reduced set of available components;

presenting the reduced set of available components to a designer to enable the designer to associate two or more components of the reduced set of available components with the coupled portions, the two or more components including at least two of a text box, a drop-down list box, a list box, an option button, or a check box;

presenting the coupled portions to the designer;

enabling the designer to select one or more of the coupled portions;

enabling the designer to associate the one or more components with the selected one or more of the coupled portions; and creating an electronic form containing data-entry fields corresponding to the two or more components associated with the coupled portions.

14. The method of claim 13, wherein the coupled portions contain information setting forth all possible documents for the coupled portion.

15. An apparatus comprising:

means for presenting hierarchical data displayed in a tree arrangement of XML data having portions represented by nodes in the tree arrangement;

means for selecting a node of the hierarchical data;

means for displaying a reduced set of one or more transformation-language components associated with the selected node of hierarchical data based on a structure of the selected node of hierarchical data, the displayed reduced set of one or more transformation-language components identified from a full set of available transformation language components, the displayed reduced set of transformation language components including at least two of a text box, a drop-down list box, a list box, an option button, or a check box, the full set of available transformation language components including at least one more available component than the reduced set of available components;

means for selecting one of the displayed transformation-language components;

means for transforming the node of hierarchical data into a visual representation according to the structure of the selected node using the selected transformation-language component;

means for displaying into an area of a screen the visual representation of the selected node;

means for repeating the previous steps;

means for saving the area of the screen containing the visual representations of one or more of the nodes into an electronic form.

* * * * *